United States Patent
Choi et al.

(10) Patent No.: US 11,636,641 B2
(45) Date of Patent: Apr. 25, 2023

(54) ELECTRONIC DEVICE FOR DISPLAYING AVATAR CORRESPONDING TO EXTERNAL OBJECT ACCORDING TO CHANGE IN POSITION OF EXTERNAL OBJECT

(71) Applicant: Samsung Electronics Co., Ltd., Gyeonggi-do (KR)

(72) Inventors: Minsheok Choi, Gyeonggi-do (KR); Jaeyun Song, Gyeonggi-do (KR); Wooyong Lee, Gyeonggi-do (KR); Hyejin Kang, Gyeonggi-do (KR); Junho An, Gyeonggi-do (KR); Hyoungjin Yoo, Gyeonggi-do (KR); Gyuhee Han, Gyeonggi-do (KR); Jiyoon Park, Gyeonggi-do (KR); Jungeun Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 6 days.

(21) Appl. No.: 17/497,165

(22) Filed: Oct. 8, 2021

(65) Prior Publication Data

US 2022/0028153 A1    Jan. 27, 2022

Related U.S. Application Data

(63) Continuation of application No. 16/535,797, filed on Aug. 8, 2019, now Pat. No. 11,145,101.

(30) Foreign Application Priority Data

Aug. 8, 2018 (KR) .................. 10-2018-0092226

(51) Int. Cl.
*G06T 13/40*     (2011.01)
*G06T 7/246*     (2017.01)
(Continued)

(52) U.S. Cl.
CPC .............. *G06T 13/40* (2013.01); *G06F 3/017* (2013.01); *G06T 3/60* (2013.01); *G06T 5/002* (2013.01);
(Continued)

(58) Field of Classification Search
CPC ........... G06T 13/40; G06T 3/60; G06T 5/002; G06T 7/246; G06T 7/70; G06T 15/20; G06F 3/017; G06V 40/168
See application file for complete search history.

(56) References Cited

U.S. PATENT DOCUMENTS 9,236,032 B2    1/2016    Choi et al.
9,245,177 B2    1/2016    Perez
(Continued)

FOREIGN PATENT DOCUMENTS

JP     2010-067022     3/2010
JP     6-298130        3/2018
(Continued)

OTHER PUBLICATIONS

International Search Report dated Dec. 4, 2019 issued in counterpart application No. PCT/KR2019/009894, 9 pages.
(Continued)

*Primary Examiner* — Ryan R Yang
(74) *Attorney, Agent, or Firm* — The Farrell Law Firm, P.C.

(57) ABSTRACT

Disclosed is an electronic device including a camera, a display, a sensor, and a processor, wherein the processor is configured to acquire one or more images including an external object through the camera, identify a position of the external object relative to the electronic device through at least one of the camera and the sensor, the position of the external object including a distance between the external object and the electronic device, determine whether the
(Continued)

distance between the external object and the electronic device is within a threshold distance range, display the avatar corresponding to the external object based on the identified position of the external object through the display, if the distance between the external object and the electronic device is within the threshold distance range, wherein a size of the avatar is determined based on the distance between the external object and the electronic device, and display a specified avatar image through the display, if the distance between the external object and the electronic device is less than or equal to a lower limit of the threshold distance range.

20 Claims, 29 Drawing Sheets

(51) Int. Cl.
| | |
|---|---|
| *G06T 7/70* | (2017.01) |
| *G06F 3/01* | (2006.01) |
| *G06T 3/60* | (2006.01) |
| *G06T 5/00* | (2006.01) |
| *G06T 15/20* | (2011.01) |
| *G06V 40/16* | (2022.01) |

(52) U.S. Cl.
CPC ............... *G06T 7/246* (2017.01); *G06T 7/70* (2017.01); *G06T 15/20* (2013.01); *G06V 40/168* (2022.01)

(56) References Cited

U.S. PATENT DOCUMENTS

| | | | |
|---|---|---|---|
| 9,410,810 | B2 | 8/2016 | Lee et al. |
| 10,339,721 | B1 | 7/2019 | Dascola |
| 10,650,539 | B2 | 5/2020 | Yan |
| 2009/0087035 | A1 | 4/2009 | Wen |
| 2010/0164956 | A1 | 7/2010 | Hyndman et al. |
| 2014/0043329 | A1 | 2/2014 | Wang |
| 2014/0139676 | A1 | 5/2014 | Wierich |
| 2014/0218371 | A1 | 8/2014 | Du |
| 2015/0286889 | A1 | 10/2015 | Nakayama |
| 2015/0286899 | A1 | 10/2015 | Nakayama |
| 2015/0325029 | A1 | 11/2015 | Li et al. |
| 2016/0148411 | A1 | 5/2016 | Chen |
| 2016/0267699 | A1 | 9/2016 | Borke |
| 2016/0335483 | A1 | 11/2016 | Pfursich |
| 2016/0350618 | A1 | 12/2016 | Meekins |
| 2017/0213076 | A1 | 7/2017 | Francisco |
| 2018/0091732 | A1 | 3/2018 | Wilson |
| 2018/0107866 | A1 | 4/2018 | Li |
| 2018/0161676 | A1 | 6/2018 | Ikeda et al. |
| 2018/0174347 | A1 | 6/2018 | Chaney |
| 2018/0253895 | A1 | 9/2018 | Arumugam |
| 2018/0300536 | A1 | 10/2018 | Owens |
| 2019/0147642 | A1 | 5/2019 | Cole |
| 2019/0247751 | A1 | 8/2019 | Tamaoki et al. |

FOREIGN PATENT DOCUMENTS

| | | | | |
|---|---|---|---|---|
| JP | 2019125278 A | * | 7/2019 | ........... A63F 13/525 |
| KR | 101306221 | | 9/2013 | |
| KR | 1020150017258 | | 2/2015 | |
| KR | 20150030993 | | 3/2015 | |

OTHER PUBLICATIONS

European Search Report dated Jan. 7, 2020 issued in counterpart application No. 19190595.9-1216, 7 pages.
Bear Chiu et al., "The Dolly Zoom: More Than A Cheap Trick", https://www.youtube.com/watch?v=u51BlwinJXO, May 24, 2017, 1 page.
European Search Report dated Jan. 18, 2021 issued in counterpart application No. 19190595.9-1216, 6 pages.
European Search Report dated Jun. 9, 2022 issued in counterpart application No. 19190595.9-1224, 14 pages.

* cited by examiner

ELECTRONIC DEVICE FOR DISPLAYING AVATAR CORRESPONDING TO EXTERNAL OBJECT ACCORDING TO CHANGE IN POSITION OF EXTERNAL OBJECT

CROSS-REFERENCE TO RELATED APPLICATION(S)

This application is a Continuation Application of U.S. patent application Ser. No. 16/535,797, filed on Aug. 8, 2019, which is based on and claims priority under 35 U.S.C. 119 to Korean Patent Application No. 10-2018-0092226, filed on Aug. 8, 2018, in the Korean Intellectual Property Office, the content of each of which is incorporated by reference herein in its entirety.

BACKGROUND

1. Field

The present disclosure relates to an electronic device for displaying an avatar corresponding to an external object according to a change in a position of the external object.

2. Description of Related Art

With the development of various technologies, electronic devices providing a user experience in a virtual space have been distributed. For example, electronic devices enabling interaction between a user and a virtual space in the virtual space have been developed.

SUMMARY

An aspect of the present disclosure provides an electronic device for determining a viewpoint related to an avatar in a virtual space.

Another aspect of the present disclosure provides an electronic device for determining attributes of a background of an avatar in a virtual space.

Another aspect of the present disclosure provides an electronic device for determining a view area of an avatar and/or a background.

Another aspect of the present disclosure provides an electronic device for applying animation schemes to an avatar.

Another aspect of the present disclosure provides an electronic device for determining a rotational angle of a virtual camera in a virtual space and a mode of an electronic device.

Another aspect of the present disclosure provides an electronic device for constructing a database of information related to an avatar.

in accordance with an aspect of the present disclosure, an electronic device is provided. The electronic device includes a camera, a display, a sensor, and a processor, wherein the processor is configured to acquire one or more images including an external object through the camera, identify a position of the external object relative to the electronic device through at least one of the camera and the sensor, the position of the external object including a distance between the external object and the electronic device, determine whether the distance between the external object and the electronic device is within a threshold distance range, display the avatar corresponding to the external object based on the identified position of the external object through the display, if the distance between the external object and the electronic device is within the threshold distance range, wherein a size of the avatar is determined based on the distance between the external object and the electronic device, and display a specified avatar image through the display, if the distance between the external object and the electronic device is less than or equal to a lower limit of the threshold distance range.

In accordance with another aspect of the present disclosure, an operating method of an electronic device comprising a camera, a display, and a sensor, includes acquiring one or more images including an external object through the camera, identifying a position of the external object relative to the electronic device through at least one of the camera and the sensor, the position of the external object including a distance between the external object and the electronic device, determining whether the distance between the external object and the electronic device is within a threshold distance range, displaying the avatar corresponding to the external object based on the identified position of the external object through the display, if the distance between the external object and the electronic device is within the threshold distance range, wherein a size of the avatar is determined based on the distance between the external object and the electronic device, and displaying a specified avatar image through the display, if the distance between the external object and the electronic device is less than or equal to a lower limit of the threshold distance range.

BRIEF DESCRIPTION OF TILE DRAWINGS

The above and other aspects, features, and advantages of certain embodiments of the present disclosure will be more apparent from the following description taken in conjunction with the accompanying drawings, in which.

DETAILED DESCRIPTION

Figure 1:
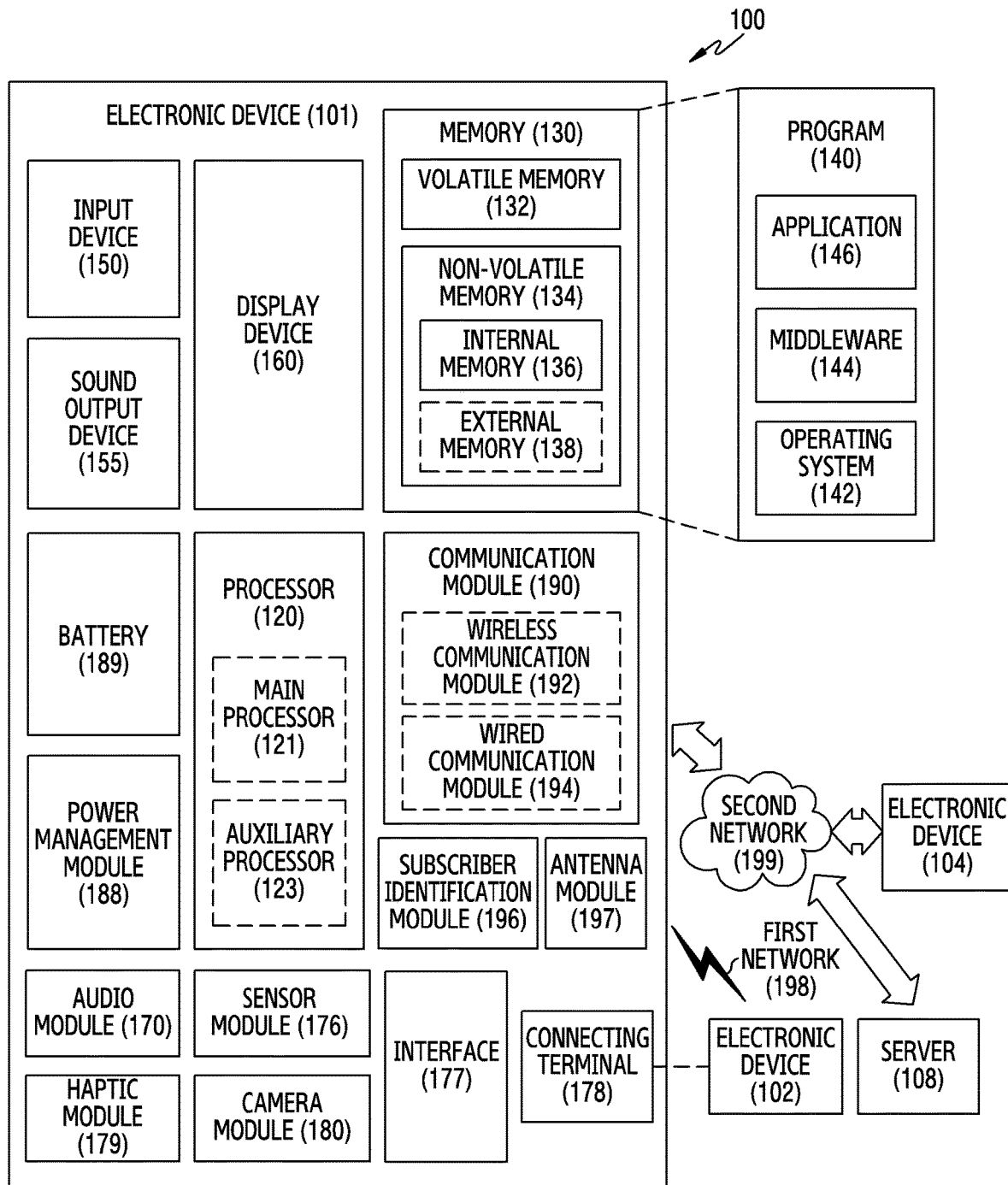
FIG. 1 is a block diagram of an electronic device within a network environment according to an embodiment.

FIG. 1 is a block diagram of an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, a memory 130, an input device 150, a sound output device 155, a display device 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or a software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some functions or states related to at least one component (e.g., the display device 160, the sensor module 176, or the communication module 190) among the components of the electronic device 101 instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for incoming calls. The receiver may be implemented as separate from, or as part of, the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device 102 directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device 102 directly (e.g., wiredly) or wirelessly. The interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with an external electronic device 102. The connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the electronic device 102, the electronic device 104, or the server 108 and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with an external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single integrated circuit or chip), or may be implemented as multi components (e.g., multi chips) separate from each other. The wireless communication module 192 may identify and authenticate the electronic device 101 in a communication network, such as the first network 198 or the second network 199, using subscriber information (e.g., an international mobile subscriber identity (IMSI)) stored in the SIM 196.

The antenna module 197 may transmit or receive a signal or power to or from the outside (e.g., an external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and an external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, a general purpose input and output (GPIO), a serial peripheral interface (SPI), or a mobile industry processor interface (MIPI).

Commands or data may be transmitted or received between the electronic device 101 and the external electronic device 104 via, the server 108 coupled with the second network 199. Each of the electronic devices 102 and 104 may be a device of a same type as, or a different type, from the electronic device 101. All or some of operations to be executed at the electronic device 101 may be executed at one or more of the external electronic device 102, the external electronic device 104, or the external server 108. For example, if the electronic device 101 should perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and transfer the outcome to the electronic device 101. The electronic device 101 may provide the outcome, with or without further processing of the outcome, as at least part of a reply to the request. To that end, a cloud computing, distributed computing, or client-server computing technology may be used, for example.

Figure 2:
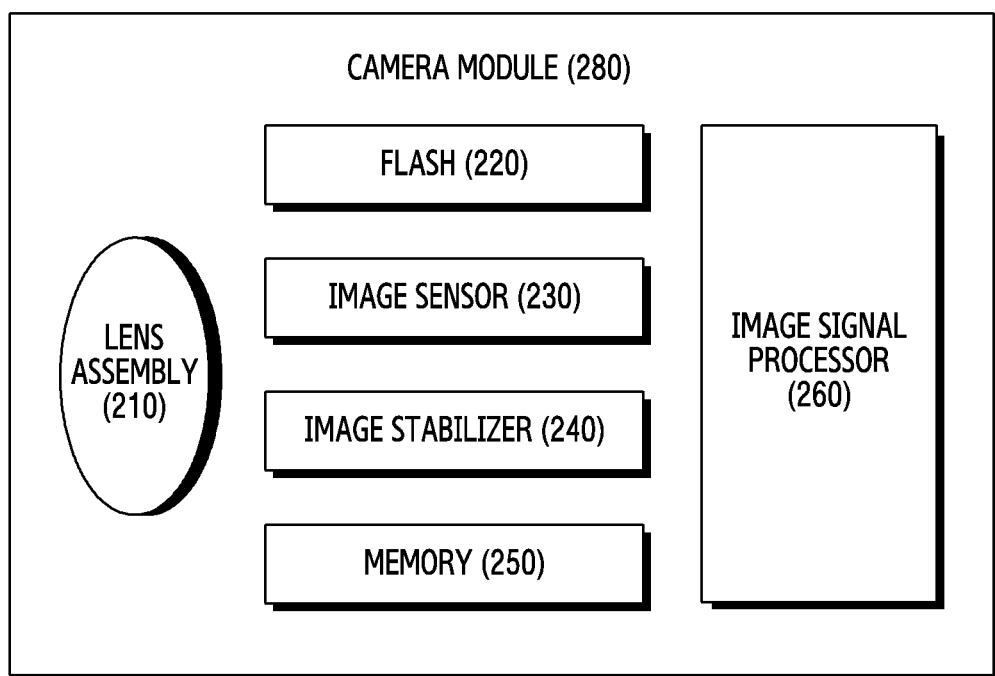
FIG. 2 is a block diagram of a camera module according to an embodiment.

FIG. 2 is a block diagram of a camera module 280 according to an embodiment.

Referring to FIG. 2, the camera module 280 may include a lens assembly 210, a flash 220, an image sensor 230, an image stabilizer 240, memory 250 (e.g., buffer memory), or an ISP 260. The lens assembly 210 may collect light emitted or reflected from an object whose image is to be taken. The lens assembly 210 may include one or more lenses. The camera module 280 may include a plurality of lens assemblies 210. In such a case, the camera module 280 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. The flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. The image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 280 or the electronic device 101 including the camera module 280. This allows compensating for at least part of a negative effect (e.g., image blurring) by the movement on an image being captured. The image stabilizer 240 may sense such a movement by the camera module 280 or the electronic device 101 using a gyro sensor or an acceleration sensor disposed inside or outside the camera module 280. The image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the ISP 260. The memory 250 may be configured as at least part of the memory 130 or as a separate memory that is operated independently from the memory 130.

The ISP 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the ISP 260 may perform control (e.g., exposure time control or read-out timing control) with respect to at least one (e.g., the image sensor 230) of the components included in the camera module 280. An image processed by the ISP 260 may be stored back in the memory 250 for further processing, or may be provided to an external component (e.g., the memory 130, the display device 160, the electronic device 102, the electronic device 104, or the server 108) outside the camera module 280. The TSP 260 may be configured as at least part of the processor 120, or as a separate processor that is operated independently from the processor 120. If the ISP 260 is configured as a separate processor from the processor 120, at least one image processed by the ISP 260 may be displayed, by the processor 120, via the display device 160 as it is or after being further processed.

The electronic device 101 may include a plurality of camera modules 280 having different attributes or functions. In such a case, at least one of the plurality of camera modules 280 may form, for example, a wide-angle camera and at least another of the plurality of camera modules 280 may form a telephoto camera. Similarly, at least one of the plurality of camera modules 280 may form, for example, a front camera and at least another of the plurality of camera modules 280 may form a rear camera.

The electronic device 101 may be one of various types of electronic devices. The electronic devices may include, for example, a portable communication device (e.g., a smartphone), a computer device, a portable multimedia device, a portable medical device, a camera, a wearable device, or a home appliance. However, the electronic devices are not limited to those described above.

It should be appreciated that various embodiments of the present disclosure and the terms used therein are not intended to limit the present disclosure but include various changes, equivalents, or replacements for a corresponding embodiment. With regard to the description of the accompanying drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B. or C," "at least one of A, B, and C," and "at least one of A, B. or C," may include any one, or all possible combinations, of the items enumerated together in a corresponding one of the phrases. As used herein, such terms as "$1^{st}$," "$2^{nd}$," "first," and "second" may be used to simply distinguish a corresponding component from another component, but does not limit the components in another aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, the processor 120 of the electronic device 101 may invoke at least one of the one or more instructions stored in the storage medium, and execute the one or more instructions, with or without using one or more other components under the control of the processor 120. This allows the electronic device 101 to be operated to perform at least one function according to the at least one instruction invoked. The one or more instructions may include code generated by a complier or code executable by an interpreter. The machine-readable storage medium may be provided in the form of a non-transitory storage medium. Wherein, the term "non-transitory" simply indicates that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 3:
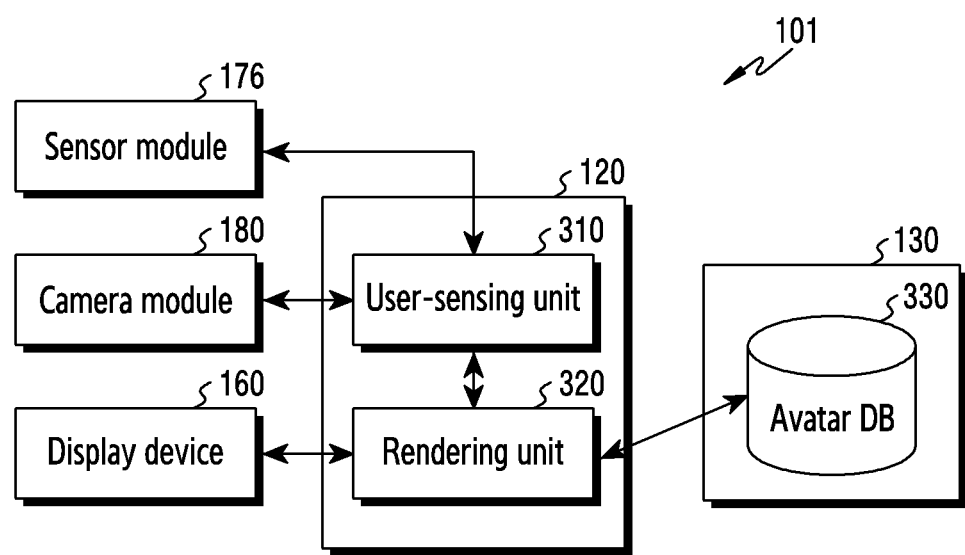
FIG. 3 is a block diagram of at least some elements included in an electronic device according to an embodiment.

FIG. 3 is a block diagram of at least some elements included in the electronic device 101 according to an embodiment.

Referring to FIG. 3, the electronic device 101 may include the sensor module 176, the camera module 180, the display device 160, the processor 120, and the memory 130. A user-sensing unit 310 and a rendering unit 320 may be software that may be used by the processor 120 or hardware included in the processor 120. An avatar DB 330 may be stored in the memory 130.

The user-sensing unit 310 may determine sensing information of an external object (for example, the user of the electronic device 101) based on information input through the camera module 180 and/or the sensor module 176. The sensing information may include at least one of a face, a facial expression, an action, a gesture, and a position of the external object. For example, the user-sensing unit 310 may detect a relative position between the external object and the electronic device 101 (for example, a position of the external object relative to the electronic device 101) and detect a change in the relative position.

The rendering unit 320 may render an avatar based on the sensing information. For example, the rendering unit 320 may render the avatar and display the same through the display unit 160.

The avatar DB 330 may store information related to the avatar. For example, the avatar DB 330 may store avatar information, background information, and configuration information. Each piece of information related to the avatar may include a set of one or more files.

The avatar information may include information for determining at least one characteristic of the avatar. For example, the avatar information may include at least one piece of information for determining a model of the avatar (or an avatar model) (for example, a method of defining points for displaying an avatar shape in a 3D virtual coordinate system and a line connecting the points), information for determining a color to be applied to the model of the avatar (for example, a method of defining an RGB color to be applied to each point of the avatar model), information for determining a normal map (for example, a method of defining a direction of points for displaying the avatar model, wherein a direction of a surface consisting of the points may be determined based on the direction of each point), information for determining the material of the avatar model, information for determining the texture of the avatar (that is, an image for mapping a 2-dimensional (2D) background image to express a 3D model), and information for determining lighting. The avatar model may be generated based on an external object in one or more images acquired through the camera module 180, preset in the memory 130, or downloaded from the server 108. Further, the avatar information may include an animation effect defined for each avatar, and the animation effect may be based on at least one of a distance between the electronic device 101 and the external object, an angle of the electronic device 101 with respect to the external object, and a gesture of the external object. The animation effect may be designated according to user input.

Background information may include information for determining at least one characteristic of a background. In other words, the background information may include information for defining a background of the avatar in a 3D virtual coordinate system. For example, the background information may include at least one of 2D background image(s), 3D background image(s), and information on a method of mapping a 2D background image to a 3D figure (for example, a cube, a sphere, or other polyhedra).

The configuration information may include at least one configuration value for controlling at least one of the avatar and the background. For example, the configuration information may include at least one piece of information for defining an action of the avatar (for example, leftward movement, rightward movement, forward movement, backward movement, and rotation of the avatar), information of ambient light of the avatar, information on a method of displaying a background image (for example, a 2D background image or a 3D background image), information on an initial position of a virtual camera in a virtual space, and information on sensitivity of the sensing information for motion of the avatar.

The term "avatar" may refer to an object in a virtual space corresponding to an external object included in one or more images acquired through a camera (for example, the camera module 180). An avatar may move in response to the motion of the external object detected by the camera module 180 and/or the sensor module 176.

The term "virtual space" may refer to a virtual space implemented by an electronic device (for example, the electronic device 101). A virtual space may correspond to a 3D virtual coordinate system.

The term "virtual camera" may refer to an object for capturing (or acquiring) an image including an avatar and/or a background in a virtual space. An image of a virtual space captured by a virtual camera may be displayed through the display device 160 of the electronic device 101. For example, the virtual camera may correspond to at least one of a position in the virtual space (or a viewpoint or coordinates (x, y, z) and a direction ($\alpha$, $\beta$, $\gamma$) in the virtual space), a view angle (or an angle of view), or a visible distance (that is, a range between a front plane and a back plane). The virtual camera may render objects within a view angle and the visible distance in a 2D form and/or a 3D form at the position (x, y, z) and direction ($\alpha$, $\beta$, $\gamma$) in the virtual space and display the same through the display device 160 or store the same in a 2D image form and/or a 3D image form.

The phrase "background of an avatar" may indicate an object other than an avatar in an image of a virtual space captured by a virtual camera. The background of an avatar may be simply referred to as a background. For example, there may be a cube surrounding an avatar in a virtual space and an image and/or a texture may be mapped to each of inner surfaces of the cube. If a virtual camera captures the avatar within the cube, the background may be a portion of the cube in the captured image. For example, there may be a sphere surrounding the avatar in the virtual space and a plurality of stitched images and/or a texture may be mapped to the inner surface of the sphere. If the virtual camera captures the avatar within the sphere, the background may be a portion of the sphere in the captured image. For example, there may be a cylinder surrounding the avatar in the virtual space, and a plurality of stitched images and/or a texture may be mapped to inner surfaces of the cylinder. If the virtual camera captures the avatar within the cylinder, the background may be a portion of the cylinder in the captured image. The aforementioned cube, sphere, and cylinder are only examples, and the background may be an object other than the avatar in the image captured by the virtual camera regardless of the shape of the virtual space.

According to an embodiment, an electronic device (for example, the electronic device 101) according to various embodiments may include a camera (for example, the camera module 180), a display (for example, the display device 160), a sensor (for example, the sensor module 176), a memory (for example, the memory 130), and a processor (for example, the processor 120), and the processor may be configured to display an avatar corresponding to an external object included in one or more images acquired using the camera through the display, identify a change in a position of the external object relative to the electronic device through at least one of the camera and the sensor, determine a viewpoint related to the displayed avatar based on the change in the position, and display the avatar, displayed based on the determined viewpoint, through the display.

The processor may be configured to determine attributes of the background of the avatar based on the positional relationship therebetween and provide the background and the avatar together through the display according to the attributes.

The attributes of the background may include a blur effect of the background, and the processor may be configured to decrease the blur effect of the background if the distance between the external object and the electronic device increases and increase the blur effect of the background if the distance between the external object and the electronic device decreases.

The processor may be configured to extract feature information related to a face of a user of the electronic device identified in the one or more images and generate the avatar reflecting the characteristics of the face of the user based on the feature information and an avatar generation model.

The processor may be configured to decrease the size of the avatar and the background of the avatar displayed through the display if the distance between the external object and the electronic device increases and increase the size of the avatar and the background of the avatar displayed through the display if the distance between the external object and the electronic device decreases.

The processor may be configured to determine whether the distance between the external object and the electronic device is within a threshold distance range, determine that the viewpoint is a position in the virtual space corresponding to the distance between the external object and the electronic device if the distance between the external object and the electronic device is within the threshold distance range, determine that the viewpoint is a position in the virtual space corresponding to an upper limit if the distance between the external object and the electronic device is greater than or equal to the upper limit of the threshold distance range, and determine that the viewpoint is a position in the virtual space corresponding to a lower limit if the distance between the external object and the electronic device is less than or equal to the lower limit of the threshold distance range.

If the distance between the external object and the electronic device is less than or equal to than the lower limit of the threshold distance range, the processor may be configured to display an area of the avatar corresponding to an area of the external object, which is not captured by the camera, as a default avatar image on the display.

The processor may be configured to determine a view area in the background of the avatar based on the position and provide the view area in the background together with the avatar through the display.

The processor may be configured to determine an angle at which the electronic device moves with respect to the external object and a direction of the angle and move the view area in the background by the angle in a direction opposite the direction.

The processor may be configured to determine a view area in the avatar based on the position and provide the view area in the avatar through the display.

The processor may be configured to determine an angle at which the electronic device moves with respect to the external object and a direction of the angle and move the view area in the avatar by the angle in the direction.

The processor may be configured to identify a plurality of components of the avatar, apply different animation schemes to at least two components of the plurality of components, and display the avatar having the at least two components, to which the different animation schemes are applied through the display.

The different animation schemes may include a motion-based animation scheme applied to a first component among the plurality of components, and the processor may be configured to identify a gesture corresponding to a gesture of the external object among a plurality of gestures configured in the electronic device according to the motion-based animation scheme, and display the first component, moving according to the identified gesture, through the display.

The different animation schemes may include a tracking-based animation scheme applied to a second component among the plurality of components, and the processor may be configured to track a change in feature points extracted from the area of the external object corresponding to the second component according to the tracking-based animation scheme and display the second component, adaptively moving according to the change in the feature points, through the display.

The different animation schemes may include a preloaded animation scheme applied to a third component among the plurality of components, and the processor may be configured to display the third component, displayed regardless of a gesture of the external object, according to the preloaded animation scheme through the display.

The processor may be configured to determine a rotational angle of the electronic device in a first mode of the electronic device, determine whether the rotational angle in the first mode is within a first threshold rotation range, reversely rotate at least a portion of an action or a position of the avatar by the rotational angle in the first mode if the rotational angle in the first mode is within the first threshold rotation range, reversely rotate at least a portion of an action or a position of the avatar by an upper limit in the first mode if the rotational angle in the first mode is greater than or equal to the upper limit of the first threshold rotation range, and reversely rotate at least a portion of an action or a position of the avatar by a lower limit in the first mode if the rotational angle in the first mode is less than or equal to the lower limit of the first threshold rotation range, and the first mode may be one of a portrait mode and a landscape mode.

The processor may be configured to determine a rotational angle of the electronic device in a first mode of the electronic device, determine whether the rotational angle in the first mode is within a second threshold rotation range, change of at least a portion of an action or a position the avatar based on the rotational angle in the first mode if the rotational angle in the first mode is within the second threshold rotation range, change the mode of the electronic device from the first mode to a second mode and change at least a portion of an action or a position of the avatar based on the rotational angle in the first mode if the rotational angle in the first mode is outside of the second threshold rotation range, and the first mode may be one of a portrait mode and a landscape mode, and the second mode may be the other of the portrait mode and the landscape mode.

According to an embodiment, an electronic device (for example, the electronic device 101) according to various embodiments may include a camera (for example, the camera module 180), a display (for example, the display device 160), a sensor (for example, the sensor module 176), a memory (for example, the memory 130), and a processor (for example, the processor 120), and the processor may be configured to display an avatar corresponding to an external object included in one or more images acquired using the camera and a background of the avatar through the display, determine at least one characteristic of the avatar based on avatar information stored in the memory, determine at least one characteristic of the background based on background information stored in the memory, and control at least one of the avatar and the background displayed through the display based on at least one configuration value of configuration information stored in the memory.

The electronic device may further include an input device, and the processor may be configured to determine at least one of the at least one characteristic of the avatar, the at least one characteristic of the background, and the at least one configuration value based on input received through the input device.

The configuration information may include an upper limit and a lower limit of a threshold distance range, and the processor may be configured to determine that a viewpoint related to the avatar in a virtual space is a position in the virtual space corresponding to a distance between the external object and the electronic device if the distance between the external object and the electronic device is within the threshold distance range, determine that the viewpoint is a position in the virtual space corresponding to an upper limit if the distance between the external object and the electronic device is greater than or equal to the upper limit, and determine that the viewpoint is a position in the virtual space corresponding to a lower limit if the distance between the external object and the electronic device is less than or equal to the lower limit.

The configuration information may include an upper limit and a lower limit of a first threshold rotation range, and the processor may be configured to change at least a portion of an action or a position of the avatar by a rotational angle in a first mode if the rotational angle of the electronic device in the first mode of the electronic device is within the first threshold rotation range, change at least the portion of the action or the position of the avatar by an upper limit in the first mode if the rotational angle in the first mode is greater than or equal to the upper limit, and reversely change at least the portion of the action or the position of the avatar by a lower limit in the first mode if the rotational angle in the first mode is less than or equal to the lower limit, and the first mode may be one of a portrait mode and a landscape mode and the second mode may be the other of the portrait mode and the landscape mode.

Figure 4A:
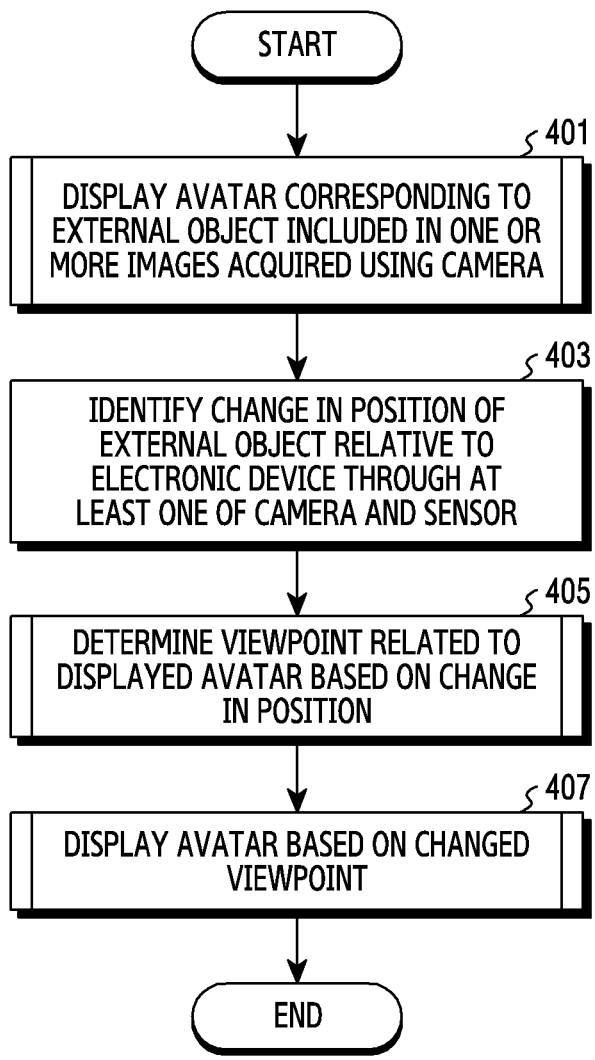
FIG. 4A is a flowchart of a method of an electronic device according to an embodiment.

FIG. 4A is a flowchart of a method of an electronic device according to an embodiment. The method according to the following figures may be performed by the electronic device 101 of FIG. 1, the electronic device 101 of FIG. 3, or the processor 120 of the electronic device 101.

Referring to FIG. 4A, in step 401, the processor 120 may display, on the display device 160, an avatar corresponding to an external object included in one or more images acquired using the camera module 180. For example, the processor 120 may capture one or more images including an external object through the camera module 180, identify the external object included in one or more images, generate an avatar corresponding to the identified external object in a virtual space, and display the generated avatar on the display device 160.

In step 403, the processor 120 may identify a change in a position of the external object relative to the electronic device 101 through at least one of the camera module 180 and the sensor module 176. In other words, the processor 120 may identify the change in the position of the external object relative to the electronic device 101 through the camera module 180, identify the change in the position of the external object relative to the electronic device 101 through the sensor module 176, or identify the change in the position of the external object relative to the electronic device 101 through both the camera module 180 and the sensor module 176. To this end, the processor 120 may determine the position of the external object relative to the electronic device 101 through at least one of the camera module 180 and the sensor module 176. The position of the external object relative to the electronic device 101 may include a relative position. In other words, the position of the external object relative to the electronic device 101 may be understood as a position of the electronic device 101 relative to the external object or a position of the external object relative to the electronic device 101. For example, if the external object corresponds to the origin (0,0,0) of a 3D coordinate system, the relative position of the electronic device 101 with respect to the external object may be defined as a position (r, θ, φ) of the electronic device 101 in a 3D coordinate system. Here, r denotes the distance between the external object and the electronic device 101, θ denotes an azimuth of the electronic device 101, and φ denotes an altitude angle of the electronic device 101, where at least one of the azimuth θ and the altitude angle φ may be an angle of the electronic device 101 with respect to the external object. In other words, the position of the external object relative to the electronic device 101 (i.e., the relative position) may be defined as a distance between the external object and the electronic device 101 and an angle of the electronic device 101 with respect to the external object. For example, the position of the electronic device 101 relative to the external object may be expressed as (x, y, z). Here, x=r cos φ cos θ, y=r cos φ sin θ, z=r sin φ. Similarly, if the electronic device 101 corresponds to the origin (0,0,0) of a 3D coordinate system, the position of the external object relative to the electronic device 101 may be defined as the location (r, θ, φ) of the external object in a 3D coordinate system. Hereinafter, although it is assumed that the external object is located at the origin (0,0,0) of the 3D coordinate system for convenience of description, the position of the external object relative to the electronic device 101 is relative, and thus various embodiments are not limited with respect to the position of the reference point.

In step 405, the processor 120 may determine a viewpoint related to the displayed avatar based on a change in the position. The viewpoint related to the avatar (or the viewpoint) may be a position of the virtual camera relative to the avatar in the virtual space (or a position of the avatar relative to the virtual camera in the virtual space). For example, if the avatar corresponds to the origin (0,0,0) of the 3D virtual coordinate system, the position of the virtual camera relative to the avatar in the virtual space may be defined as a position (r', θ', φ') of the virtual camera in the 3D virtual coordinate system. Here, r' denotes the distance between the avatar and the virtual camera, θ' denotes the azimuth of the virtual camera, and φ' denotes an altitude angle of the virtual camera, where at least one of the azimuth θ' and the altitude angle φ' may be an angle of the virtual camera with respect to the avatar. In other words, the viewpoint may be defined as a distance between the avatar and the virtual camera and an angle of the virtual camera with respect to the avatar. For example, a relative position of the electronic device 101 with respect to the external object may be expressed as (x', y', z'). Here, x'=r' cos φ' cos θ', y'=r' cos φ' sin θ', z'=r' sin φ'. Similarly, the position of the avatar relative to the virtual camera may also be defined, (that is, when the position of the virtual camera is the origin (0,0,0)), but it is assumed that the avatar is located at the origin (0,0,0) of the 3D virtual coordinate system for convenience of description.

The distance between the avatar and the viewpoint may be proportional to the distance between the external object and the electronic device 101 (e.g., the ratio thereof may be variously defined), and the angle of the viewpoint with respect to the avatar may be proportional to the angle of the electronic device 101 with respect to the external object (the ratio thereof may be variously defined). Accordingly, the processor 120 may define a viewpoint related to the avatar and a change in the viewpoint based on a change in the position of the external object relative to the electronic device 101.

In step 407, the processor 120 may display the avatar expressed based on the determined viewpoint on the display device 160. The processor 120 may display one or more images acquired (or captured) by the virtual camera corresponding, to the viewpoint on the display device 160, and the one or more images may include an avatar and/or a background of the avatar.

Figure 4B:
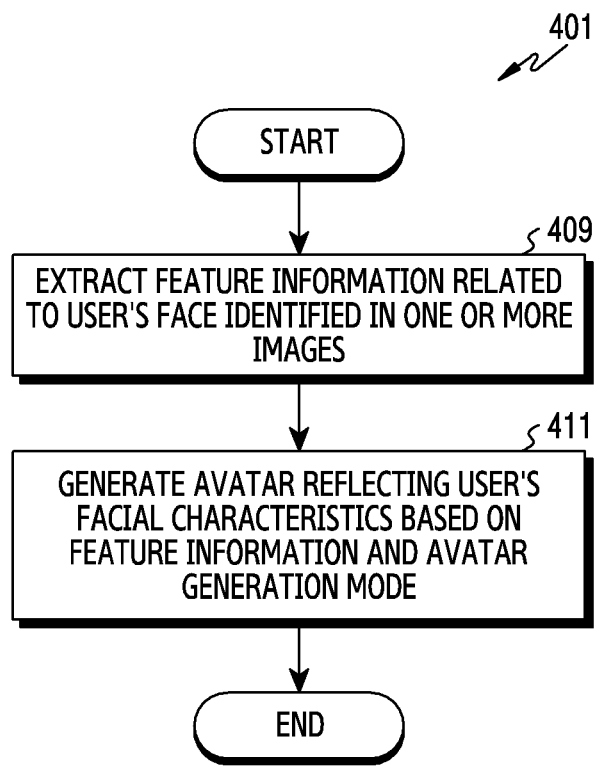
FIG. 4B is a flowchart of a method of an electronic device for generating an avatar according to an embodiment.

FIG. 4B is a flowchart of a method of the electronic device according to an embodiment. The operation may be performed by the electronic device 101 of FIG. 1, the electronic device 101 of FIG. 3, or the processor 120 of the electronic device 101.

Referring to FIG. 413, steps 409 and 411 may be associated with step 401 of FIG. 4A.

In step 409, the processor 120 may extract feature information related to a user's face identified in one or more images. The user may be a user of the electronic device 101, and may correspond to an external object in one or more images acquired by the camera module 180. For example, the processor 120 may identify the user's face in the one or more images through at least one of the camera module 180 and the sensor module 176 and extract feature information related to the user's face and/or feature points of the user's face.

In step 411, the processor 120 may generate an avatar reflecting the user's face characteristic based on feature information and an avatar generation model. The avatar generation model may be information forming a basis (e.g., basis information) for generating the avatar. For example, the avatar generation model may include at least one of a shape of the avatar and a method of defining a direction of a line connecting points for expressing the avatar shape and/or the points. The avatar generation model may be referred to as a morph target, and may be pre-stored in the memory 130 (that is, the avatar generation model may be predefined), or may be generated by the processor 120 based on feature information. The processor 120 may generate an avatar reflecting the user's facial characteristics (for example, including at least one of the arrangement, size, shape, and color of the eyes, nose, and mouth, a skin tone, and a skin texture) based on feature information and the avatar generation model.

Figure 4C:
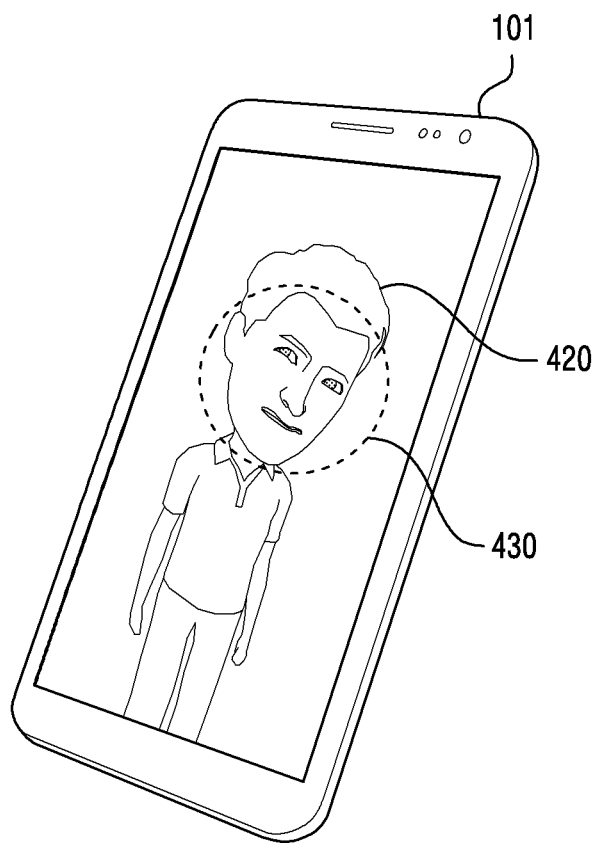
FIG. 4C is an illustration of an avatar reflecting a user's facial characteristics according to an embodiment.

FIG. 4C is an illustration of an avatar reflecting a user's facial characteristics according to an embodiment.

Referring to FIG. 4C, the processor 120 may display an avatar 420 on the display unit 160 of the electronic device 101. The avatar 420 may include an area 430 corresponding to an area of the external object (for example, a face of a user of the electronic device 101) from which feature information is extracted in order to generate the avatar 420. The processor 120 may track feature points related to the user's face and adaptively change a facial expression, a position, and/or an action of the avatar in the area 430 in response to a change in feature points.

Although FIG. 4C illustrates that the avatar has a human shape, this is only an example, and the shape of the avatar may be variously displayed. For example, the processor 120 may adaptively change a facial expression, a position, and/or an action of the avatar in a character form in the area 430 according to a change in feature points through the feature information related to the user's face and the avatar model in the character form (for example, in the form of an animal character).

The avatar 420 may be divided into a plurality of elements, and different animation schemes may be applied to the respective elements. For example, a tracking-based animation scheme which is based on feature points such as the avatar's face in the area 430 may be applied to some of the elements of the avatar 420, and at least one of a motion-based animation scheme and a preloaded animation scheme may be applied to other elements. Embodiments of the animation scheme are described in more detail with reference to FIGS. 11 and 12.

Figure 5:
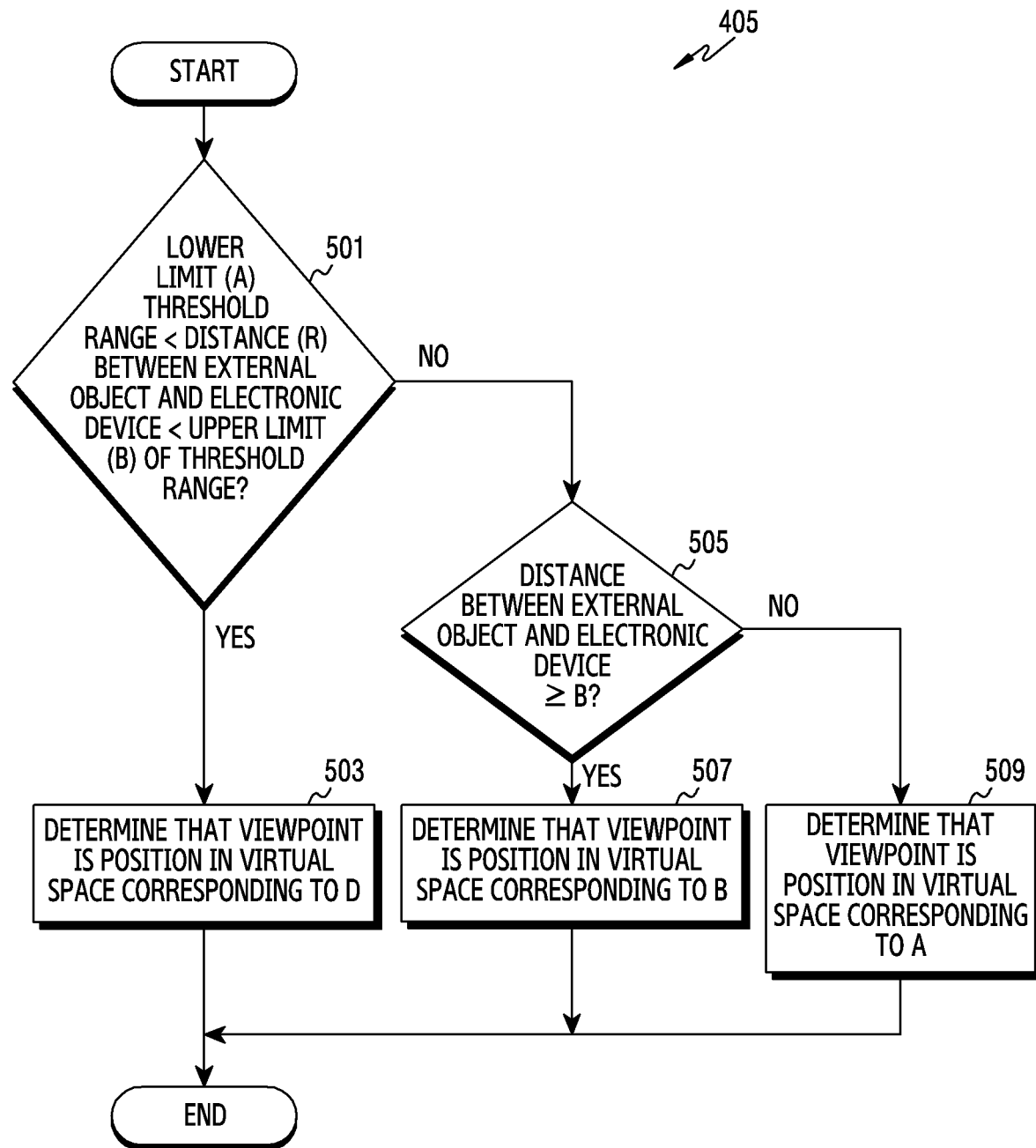
FIG. 5 is a flowchart of a method of an electronic device for determining a viewpoint related to an avatar according to an embodiment.

FIG. 5 is a flowchart of a method of an electronic device for determining a viewpoint related to an avatar according to an embodiment. The operation may be performed by the electronic device 101 of FIG. 1, the electronic device 101 of FIG. 3, or the processor 120 of the electronic device 101.

Referring to FIG. 5, steps 501, 503, 505, 507, and 509 may be associated with step 405 of FIG. 4A.

In step 501, the processor 120 may determine whether a distance (r) between an external object and the electronic device 101 is greater than a lower limit (a) of a threshold distance range and less than an upper limit (b) of the threshold distance range. In other words, the processor 120 may determine whether the distance between the external object and the electronic device 101 is within the threshold distance range. If the distance between the external device and the electronic device 101 is within the threshold distance range, the processor 120 may perform step 503. Otherwise, if the distance between the external object and the electronic device 101 is outside of the threshold distance range, the processor 120 may perform step 505.

The processor 120 may determine the distance between the external object and the electronic device 101. For example, the processor 120 may recognize a portion of the external object (for example, a face of the external object) in a camera preview displayed by the display device 160 and determine the distance between the external object and the electronic device 101 based on a ratio of an area of the portion of the external object to an area of the camera preview. For example, the distance between the external object and the electronic device 101 may be determined to be relatively short if the ratio of the area of the portion of the external object to the area of the camera preview is relatively large, and may be determined to be relatively long if the ratio of the area of the portion of the external object to the area of the camera preview is relatively small. For example, the processor 120 may use a measured distance from a wearable sensor installed to the external object, or may use a distance measured by a time-of-flight (ToF) type 3D camera to determine the distance between the external object and the electronic device 101.

In step 503, the processor 120 may determine a viewpoint as a position in a virtual space corresponding to the distance between the external object and the electronic device. In other words, the processor 120 may dispose the virtual camera at the position in the virtual space corresponding to the distance between the external object and the electronic device. Accordingly, if the distance between the external object and the electronic device increases within the threshold distance range, the distance between the avatar and the virtual camera increases in the virtual space (that is, a view angle (or an angle of view) of the virtual camera decreases), so that the size of the avatar and/or the background displayed on the display device 160 of the electronic device 101 may increase. Otherwise, if the distance between the external object and the electronic device decreases within the threshold distance range, the distance between the avatar and the virtual camera decreases in the virtual space (that is, a view angle (or an angle of view) of the virtual camera increases), so that the size of the avatar and/or the background displayed on the display device 160 of the electronic device 101 may decrease.

For example, a percentage corresponding to the lower limit (a) of the threshold distance range may be 40%, and a percentage corresponding to the upper limit (b) may be 110%. If the percentage in the camera preview displayed by the display device 160 of the electronic device 101 is greater than 40% and less than 110% (that is, if the distance between the external object and the electronic device 101 is within a threshold distance range), the processor 120 may determine that the viewpoint is a position in the virtual space corresponding to the percentage in the camera preview displayed by the display device 160 of the electronic device 101, or may move the avatar and/or the background to the position in the virtual space corresponding to the percentage in the camera preview.

In step 505, the processor 120 may determine whether the distance between the external object and the electronic device is greater than or equal to the upper limit (b) of the threshold distance range. If the distance between the external object and the electronic device is greater than or equal to the upper limit (b) of the threshold distance range, the processor 120 may perform step 507, However, if the distance between the external object and the electronic device is less than the upper limit (b) of the threshold distance range, the processor 120 may perform step 509.

In step 507, the processor 120 may determine the viewpoint as a position in the virtual space corresponding to the upper limit (b) of the threshold distance range. In other words, the processor 120 may dispose the virtual camera at the position in the virtual space corresponding to the upper limit (b) of the threshold distance range. Accordingly, under the condition that the distance between the external object and the electronic device is greater than or equal to the upper limit (b) of the threshold distance range, even though the distance between the external object and the electronic device increases, the distance between the avatar and the virtual camera is maintained at the distance corresponding to the upper limit of the threshold distance range (that is, the view angle of the virtual camera is maintained), so that the size of the avatar and/or the background displayed by the display device 160 of the electronic device 101 may be maintained.

For example, a percentage corresponding to the lower limit (a) of the threshold distance range may be 40% and a percentage corresponding to the upper limit (b) may be 110%. If the percentage in the camera preview displayed by the display device 160 of the electronic device 101 is greater than or equal to 110% (that is, if the distance between the external object and the electronic device 101 is less than or equal to an upper limit of a threshold distance range), the processor 120 may determine that the viewpoint is a position in the virtual space corresponding to the percentage of 110%, regardless of the percentage in the camera preview displayed by the display device 160 of the electronic device 101, or may move the avatar and/or the background to the position in the virtual space corresponding to 110%.

In step 509, the processor 120 may determine the viewpoint as a position in the virtual space corresponding to the lower limit (a) of the threshold distance range. In other words, the processor 120 may dispose the virtual camera at the position in the virtual space corresponding to the lower limit (a) of the threshold distance range. Accordingly, under the condition that the distance between the external object and the electronic device is less than or equal to the lower limit (a) of the threshold distance range, even if the distance between the external object and the electronic device decreases, the distance between the avatar and the virtual camera in the virtual space remains at the distance corresponding to the lower limit of the threshold distance range (that is, the view angle of the virtual camera is maintained), so that the size of the avatar and/or the background displayed by the display device 160 of the electronic device 101 may be maintained.

For example, a percentage corresponding to the lower limit (a) of the threshold distance range may be 40% and a percentage corresponding to the upper limit (b) may be 110%. If the percentage in the camera preview displayed by the display device 160 of the electronic device 101 is less than or equal to 40% (that is, if the distance between the external object and the electronic device 101 is less than or equal to a lower limit of the threshold distance range), the processor 120 may determine that the viewpoint is a position in the virtual space corresponding to the percentage of 40%, regardless of the percentage in the camera preview displayed by the display device 160 of the electronic device 101, or may move the avatar and/or the background to the position in the virtual space corresponding to 40%.

If the distance between the external object and the electronic device 101 is less than the lower limit of the threshold distance range, a portion of the external object may not be displayed in the camera preview of the display device 160. In other words, a portion of the area of the external object may not be captured by the camera module 180. In this case, the processor 120 may express an area of the avatar corresponding to the area of the external object which is not captured by the camera module 180 as a default avatar image. The processor 120 may change the area of the avatar corresponding to the area of the external object captured by the camera module 180 in the display device 160 in response to motion of the area of the external object. Otherwise, the processor 120 may not change an area of the avatar corresponding to another area of the external object which is not captured by the camera module 180 in the display device 160, but may maintain the same as the default avatar image in spite of motion of the external object. The default avatar image is an image which is the basis of the avatar image and may be an initial avatar image configured regardless of motion of the external object.

If the distance between the external object and the electronic device 101 is outside of the threshold distance range, the processor 120 may determine the viewpoint as the position in the virtual space corresponding to the distance within the threshold distance range, render an avatar having a size corresponding to the distance within the threshold distance range, and display the avatar on the display device 160.

Figure 6A:
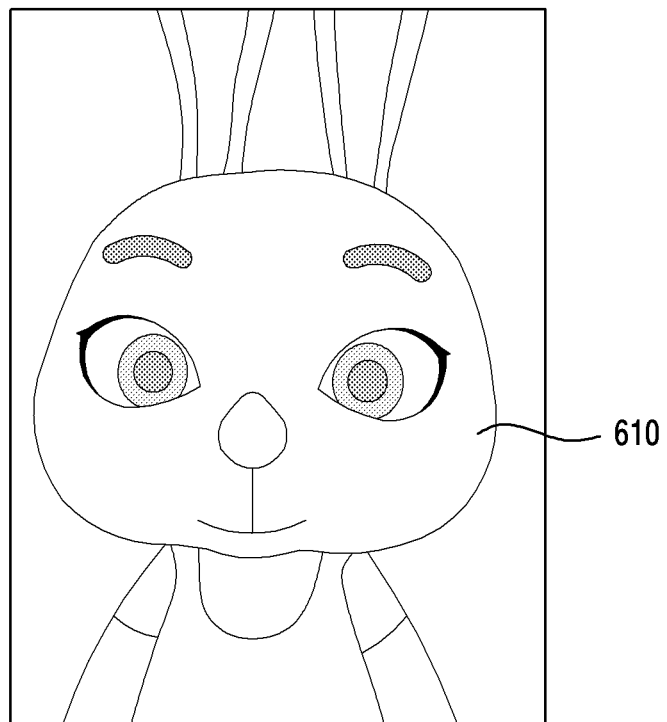
FIGS. 6A and 6B are illustrations of avatars in various sizes displayed on a display device of an electronic device according to an embodiment.
Figure 6B:
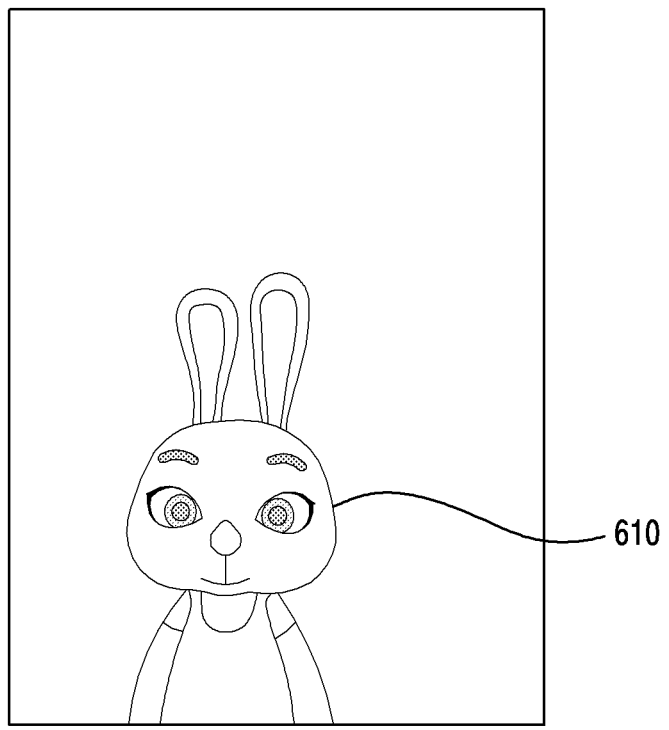

FIGS. 6A and 6B are illustrations of avatars in various sizes displayed on a display device of an electronic device according to an embodiment.

Referring to FIG. 6A, the processor 120 may display an avatar 610 at a size corresponding to a lower limit (a) of a threshold distance range on the display device 160, In other words, the processor 120 may determine a viewpoint as a position of a virtual space corresponding to the lower limit (a) of the threshold distance range. In this case, under the condition that the distance between the external object and the electronic device 101 is the lower limit of the threshold distance range, even if the external object and the electronic device 101 come close to each other, the processor 120 may maintain the viewpoint as the position in the virtual space corresponding to the lower limit of the threshold distance range and display the avatar 610 at a size displayed on the display device 160 in FIG. 6A.

Referring to FIG. 6B, the processor 120 may display the avatar 610 at a size corresponding to the upper limit (b) of the threshold distance range on the display device 160. In other words, the processor 120 may determine the viewpoint as a position in the virtual space corresponding to the upper limit (b) of the threshold distance range. In this case, under the condition that the distance between the external object and the electronic device 101 is greater than or equal to the upper limit of the threshold distance range, even though the external object and the electronic device 101 move far away from each other, the processor 120 may maintain the viewpoint as the position in the virtual space corresponding to the upper limit of the threshold distance range and display the avatar 610 at a size displayed on the display device 160 in FIG. 6B.

The processor 120 may display an avatar which is smaller than that illustrated in FIG. 6A or larger than that illustrated in FIG. 6B on the display device 160. For example, if the distance between the external object and the electronic device 101 is within the threshold distance range, the processor 120 may display an avatar which is smaller than that illustrated in FIG. 6A and larger than that illustrated in FIG. 6B on the display device 160.

Figure 7:
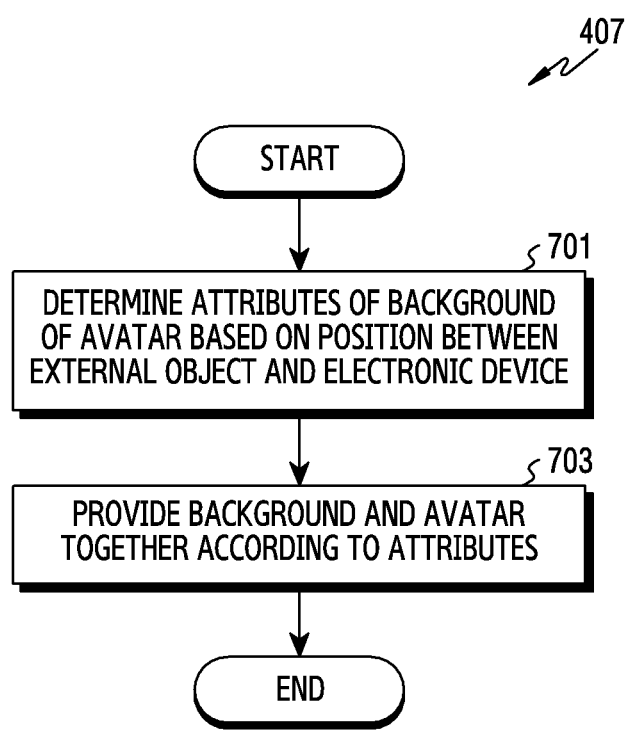
FIG. 7 is a flowchart of a method of an electronic device for determining attributes of a background of an avatar according to an embodiment.

FIG. 7 is a flowchart of a method of an electronic device for determining attributes of a background of an avatar according to an embodiment. The operation may be performed by the electronic device 101 of FIG. 1, the electronic device 101 of FIG. 3, or the processor 120 of the electronic device 101.

Referring to FIG. 7, steps 701 and 703 may be associated with step 407 of FIG. 4A.

In step 701, the processor 120 may determine attributes of the background of the avatar based on a position of the external object relative to the electronic device 101. For example, the processor 120 may determine different background attributes depending on the distance between the external object and the electronic device 101. The background attributes may include at least one of a blur effect and brightness.

In step 703, the processor 120 may provide the background along with an avatar according to the determined attributes through the display device 160. For example, the processor 120 may apply different blur effects depending on the distance between the external object and the electronic device 101, and may display the background reflecting the corresponding blur effect along with the avatar on the display device 160. For example, the processor 120 may apply different brightnesses depending on the distance between the external object and the electronic device 101, and may display the background having the corresponding brightness along with the avatar on the display device 160.

Hereinafter, in FIGS. 8A, 8B, and 8C, an example of an operation of the electronic device 101 for controlling a background blur effect based on the position of the external object relative to the electronic device 101 is described below in greater detail.

Figure 8A:
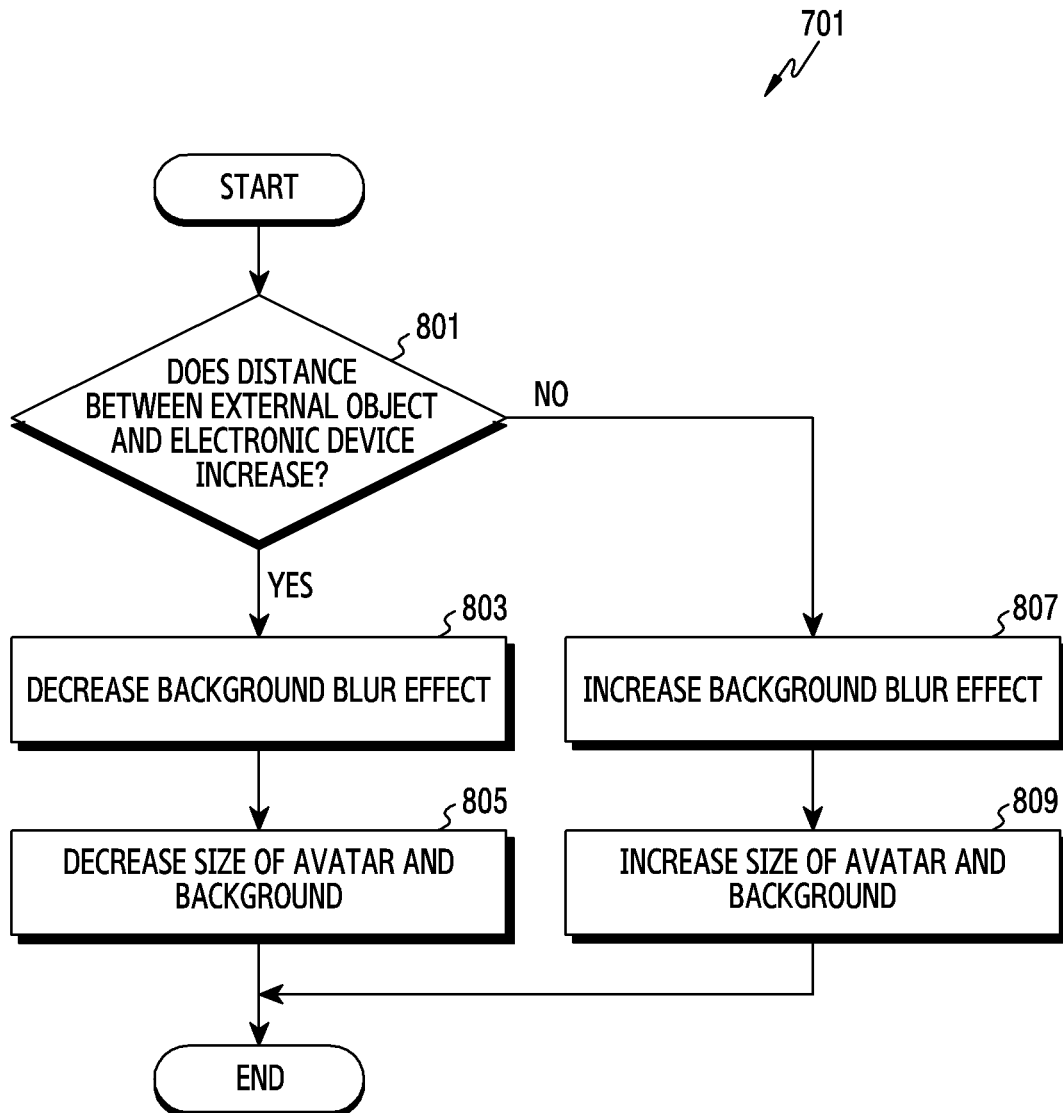
FIG. 8A is a flowchart of a method of an electronic device for controlling a background blur effect according to an embodiment.

FIG. 8A is a flowchart of a method of an electronic device for controlling a background blur effect according to an embodiment. The operation may be performed by the electronic device 101 of FIG. 1, the electronic device 101 of FIG. 3, or the processor 120 of the electronic device 101.

Referring to FIG. 8A, steps 801, 803, 805, 807, and 809 may be associated with step 701 of FIG. 7.

In step 801, the processor 120 may determine whether a distance between an external object and the electronic device 101 increases. For example, the processor 120 may determine whether the distance between the external object and the electronic device 101 increases based on at least one of a size of the external object in a camera preview displayed on the display device 160, measurement by a wearable sensor installed in the external device, and measurement using a ToF-type 3D camera. If the distance between the external object and the electronic device 101 increases, the processor 120 may perform steps 803 and 805. Otherwise, if the distance between the external object and the electronic device 101 does not increase (that is, the distance decreases), the processor 120 may perform steps 807 and 809.

In step 803, the processor 120 may reduce a background blur effect. In step 805, the processor 120 may reduce the size of the avatar and the background (that is, may reduce the view angle of the virtual camera) displayed on the display device 160. If the distance between the external object and the electronic device 101 increases, the distance between the avatar and the viewpoint also increases, and, thus, the size of the avatar and the background displayed on the display device 160 may decrease. Since the size of the avatar decreases, the processor 120 may reduce the background blur effect in order to more clearly display the background. Although FIG. 8 illustrates that step 803 is performed before step 805, this is only an example, and step 805 may be performed before step 803. Alternatively, step 803 and step 805 may be performed simultaneously. For example, only one of step 803 and step 805 may be performed. In other words, the remaining one of step 803 and step 805 may be omitted.

In step 807, the processor 120 may increase the background blur effect. In step 809, the processor 120 may increase the size of the avatar and the background (that is, may increase the view angle of the virtual camera) displayed on the display device 160. If the distance between the external object and the electronic device 101 decreases, the distance between the avatar and the viewpoint also decreases, thus, the size of the avatar and the background displayed on the display device 160 may increase. Since the size of the avatar increases, the processor 120 may increase the background blur effect in order to further emphasize the avatar. Although FIG. 8 illustrates that step 807 is performed before step 809, this is only an example, and step 809 may be performed before step 807. Alternatively, step 807 and step 809 may be performed simultaneously. For example, only one of step 807 and step 809 may be performed. In other words, the remaining one of step 807 and step 809 may be omitted.

In step 801, the processor 120 determines whether the distance between the external object and the electronic device 101 increases under the condition that the distance between the external object and the electronic device 101 is within the threshold distance range. Otherwise, the processor 120 may not reduce the background blur effect (that is, may maintain the same) in step 803, and may not reduce the size of the avatar or the background (that is, may maintain the same) in step 805 even though the distance between the external object and the electronic device 101 increases. Further, the processor 120 may not increase the background blur effect (that is, may maintain the same) in step 807 and may not increase the size of the avatar and the background (that is, may maintain the same) in step 809 even though the distance between the external object and the electronic device 101 decreases.

The processor 120 may control illumination of the background based on the distance between the external object and the electronic device 101. For example, if the distance between the external object and the electronic device 101 increases, the processor 120 may increase the brightness of the background in order to make the background more clearly visible. Otherwise, if the distance between the external object and the electronic device 101 decreases, the processor 120 may decrease the brightness of the background in order to further highlight the avatar.

Figure 8B:
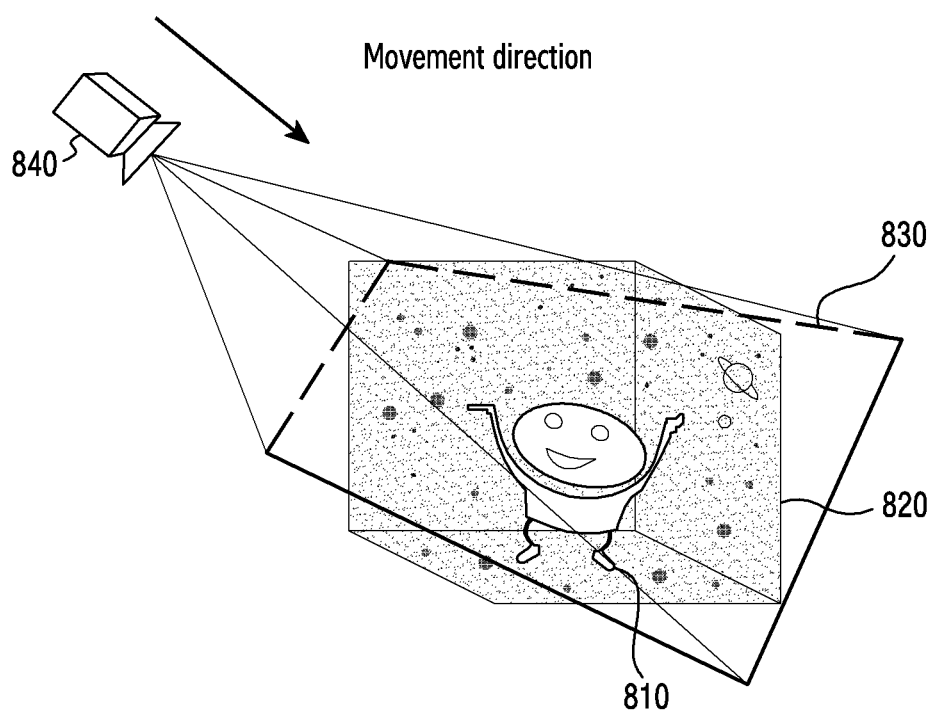
FIG. 8B is an illustration of a relationship between movement of a viewpoint and a change in a view area according to an embodiment.
Figure 8C:
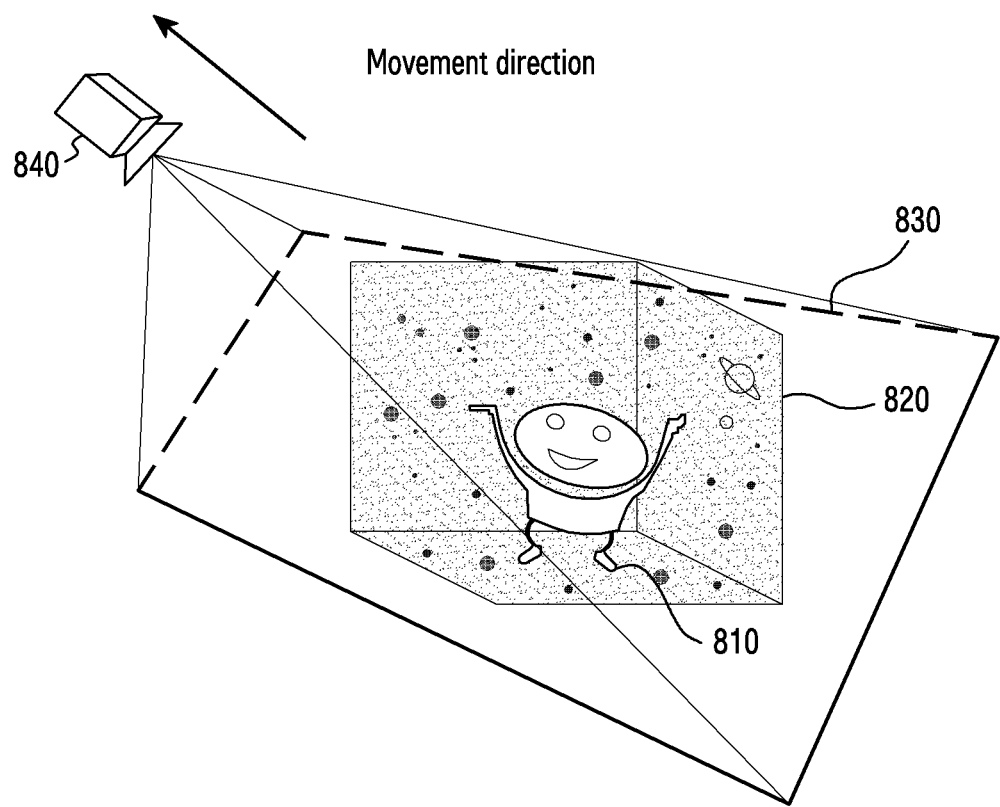
FIG. 8C is an illustration of a relationship between movement of a viewpoint and a change in a view area according to an embodiment.

FIG. 8B is an illustration of a relationship between movement of a viewpoint and a change in a view area according to an embodiment, and FIG. 8C is an illustration of a relationship between movement of a viewpoint and a change in a view area according to an embodiment.

Referring to FIG. 8B, as a viewpoint 840 is closer to an avatar 810 (that is, as the distance between the external object and the electronic device 101 decreases), a view angle of the virtual camera corresponding to the viewpoint 840 may increase, and the area captured by the virtual camera in the virtual space (hereinafter, referred to as a capture area 830) may relatively decrease. Accordingly, as the viewpoint 840 is closer to the avatar 810, the size of the avatar 810 and a background 820 displayed on the display device 160 of the electronic device 101 may become relatively larger.

Referring to FIG. 8C, as the viewpoint 840 is farther from the avatar 810 (that is, as the distance between the external object and the electronic device 101 increases), the view angle of the virtual camera may decrease and the capture area 830 may relatively increase. Accordingly, as the viewpoint 840 is farther from the avatar 810, the size of the avatar 810 and the background 820 displayed on the display device 160 of the electronic device 101 may become relatively smaller.

Figure 9A:
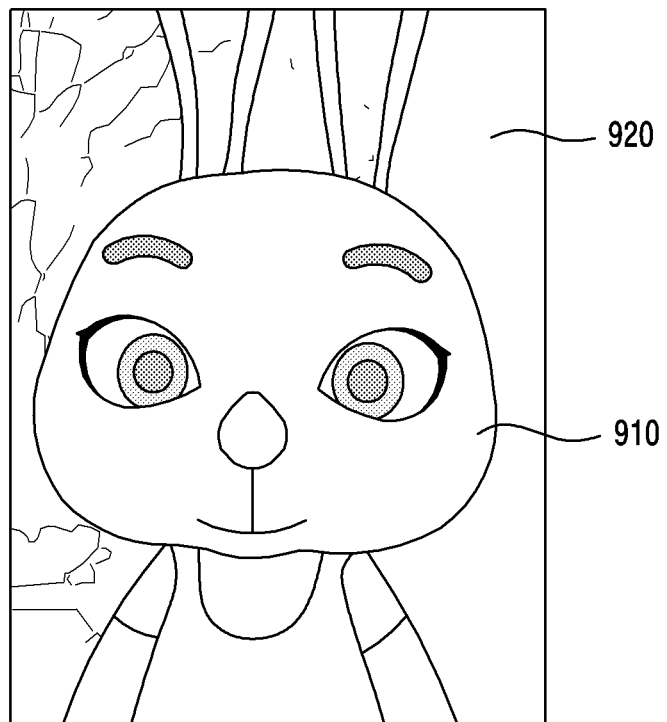
FIG. 9A is an illustration of a relationship between a background blur effect and a viewpoint according to an embodiment.
Figure 9B:
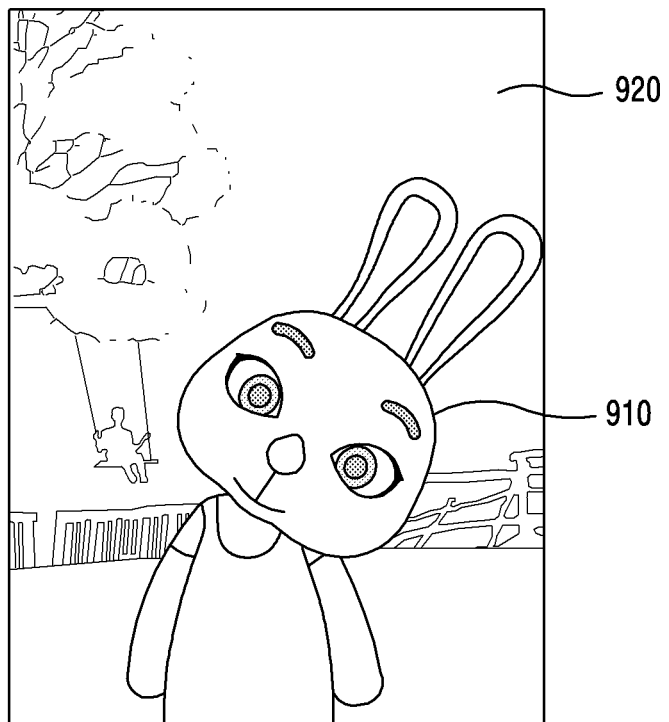
FIG. 9B is an illustration of a relationship between a background blur effect and a viewpoint according to an embodiment.
Figure 9C:
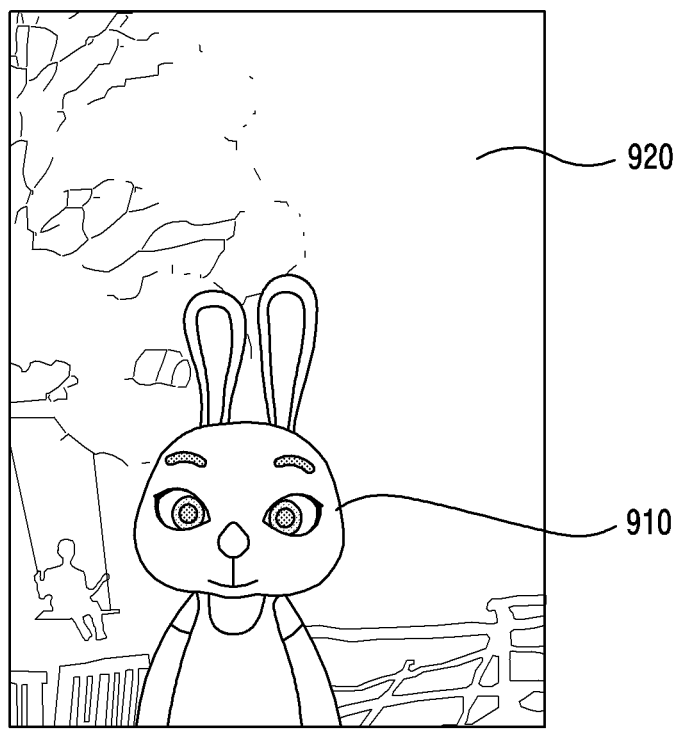
FIG. 9C is an illustration of a relationship between a background blur effect and a viewpoint according to an embodiment.

FIG. 9A is an illustration of a relationship between a background blur effect and a viewpoint according to an embodiment, FIG. 9B is an illustration of a relationship between a background blur effect and a viewpoint according to an embodiment, and FIG. 9C is an illustration of a relationship between a background blur effect and a viewpoint according to an embodiment, in FIGS. 9A, 9B, and 9C, a distance between an avatar and a viewpoint in a virtual space may be proportional to a distance between an external object and the electronic device 101.

Referring to FIGS. 9A, 9B, and 9C, the distance between the external object and the electronic device 101 is the shortest in the case of FIG. 9A, is longer than that of FIG. 9A in the case of FIG. 9B, and is longest in the case of FIG. 9C. Accordingly, the size of an avatar 910 and a background 920 displayed on the display device 160 (that is, a view angle of the virtual camera) is greatest in the case of FIG. 9A, is less than that of FIG. 9A in the case of FIG. 9B, and is smallest in the case of FIG. 9C.

The blur effect for the background 920 may be the greatest in the case of FIG. 9A, in which the size of the avatar 910 is the largest. Accordingly, the processor 120 may increase the blur effect for the background 920 in order to further emphasize the relatively large avatar 910. Otherwise, the blur effect for the background 920 may be the least in the case of FIG. 9C, in which the size of the avatar 910 is the smallest. Accordingly, the processor 120 may reduce the blur effect for the background 920 in order to more clearly display the relatively large background 920 on the display device 160.

The background blur effect in the case of FIG. 9B may be less than in the case of FIG. 9A and greater than in the case of FIG. 9C, In other words, the background blur effect may continuously change according to the distance between the external object and the electronic device 101. For example, the background blur effect in the case of FIG. 9B may be the same as that of FIG. 9A or that of FIG. 9C. In other words, the background blur effect may discontinuously change according to the distance between the external object and the electronic device 101. For example, if the distance between the external object and the electronic device 101 is greater than a threshold value (or less than a threshold value), the background blur effect may change, and the number of threshold values may be one or more.

Although FIGS. 9A, 9B, and 9C illustrate the background blur effect by way of example, the embodiments of FIGS. 9A, 9B, and 9C may be applied to other background attributes. For example, the embodiments of FIGS. 9A, 9B, and 9C may also be applied to the brightness of the background.

Figure 10:
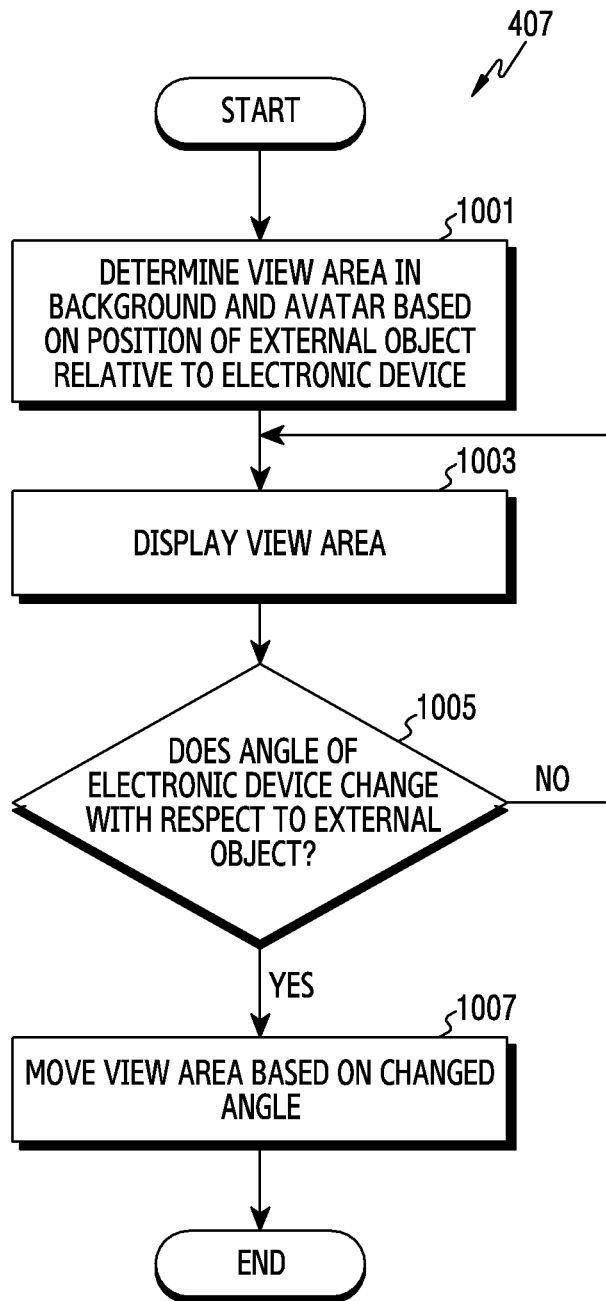
FIG. 10 is a flowchart of a method of an electronic device for determining a display area in a background and an avatar according to an embodiment.

FIG. 10 is a flowchart of a method of an electronic device for determining a view area in a background and an avatar according to an embodiment. The operation may be performed by the electronic device 101 of FIG. 1, the electronic device 101 of FIG. 3, or the processor 120 of the electronic device 101.

Referring to FIG. 10, steps 1001, 1003, 1005, and 1007 may be associated with step 407 of FIG. 4A.

In step 1001, the processor 120 may determine a view area in the background and the avatar based on the position of an external object relative to the electronic device 101. The view area in the background may be an area which is captured by the virtual camera and displayed on the display device 160 among all areas of the background disposed in the virtual space. The view area in the avatar may be an area which is captured by the virtual camera in a 3D model of the avatar in the virtual space and displayed on the display device 160. The view area may include at least one of a view area in the background and a view area in the avatar. The processor 210 may determine a viewpoint based on the position of the external object relative to the electronic device 101 and determine the view areas in the background and the avatar based on the viewpoint.

In step 1003, the processor 120 may display the view area on the display device 160. The processor 120 may determine the distance between the avatar and the virtual camera in the virtual space and the angle of the virtual camera with respect to the avatar, and may display an area of the background and the avatar captured by the virtual camera at the determined angle and distance.

In step 1005, the processor 120 may determine whether the angle of the electronic device 101 relative to the external object is changed. For example, the angle of the electronic device 101 with respect to the external object may move based on motion of at least one of the electronic device 101 and the external object. The processor 120 may detect the motion of at least one of the external object and the electronic device 101, and may determine whether the angle of the electronic device 101 changes relative to the external object. If the angle of the electronic device 101 changes relative to the external object, the processor 120 may perform step 1007. If the angle of the electronic device 101 does not change relative to the external object, the processor 120 may determine whether the angle of the electronic device 101 changes relative to the external object in step 1003.

In step 1007, the processor 120 may move the view area based on the changed angle of the electronic device 101 with respect to the external object. The processor 120 may determine the changed angle of the electronic device 101 with respect to the external object and the direction of the angle. The direction of the angle may indicate whether the angle increases in a positive direction or decreases in a negative direction. The processor 120 may determine the changed angle of the virtual camera with respect to the avatar and the direction of the angle based on the changed angle of the electronic device 101 with respect to the external object and the direction of the angle in the virtual space. For example, the changed angle of the virtual camera with respect to the avatar may be the same as or proportional to the moved angle of the electronic device with respect to the external object. The direction of the changed angle of the virtual camera with respect to the avatar may be the same as the direction of the changed angle of the electronic device with respect to the external object.

The processor 120 may determine the changed angle of the electronic device 101 with respect to the external object and the direction of the angle and move the view area of the background in a direction opposite the corresponding direction by the corresponding angle in the background. Since an area moved from a reference area in the background in the direction opposite the corresponding direction by the corresponding angle is captured by the virtual camera in the virtual space according to movement of the electronic device 101, the processor 120 may move the view area to the captured background area.

The processor 120 may determine the changed angle of the electronic device 101 with respect to the external object and the direction of the angle and move the view area of the avatar in the corresponding direction by the corresponding angle in the avatar. Since an area moved from a reference area in a 3D model of the avatar in the corresponding direction by the corresponding angle is captured by the virtual camera in the virtual space according to movement of the electronic device 101, the processor 120 may move the view area to the captured avatar area.

Figure 11:
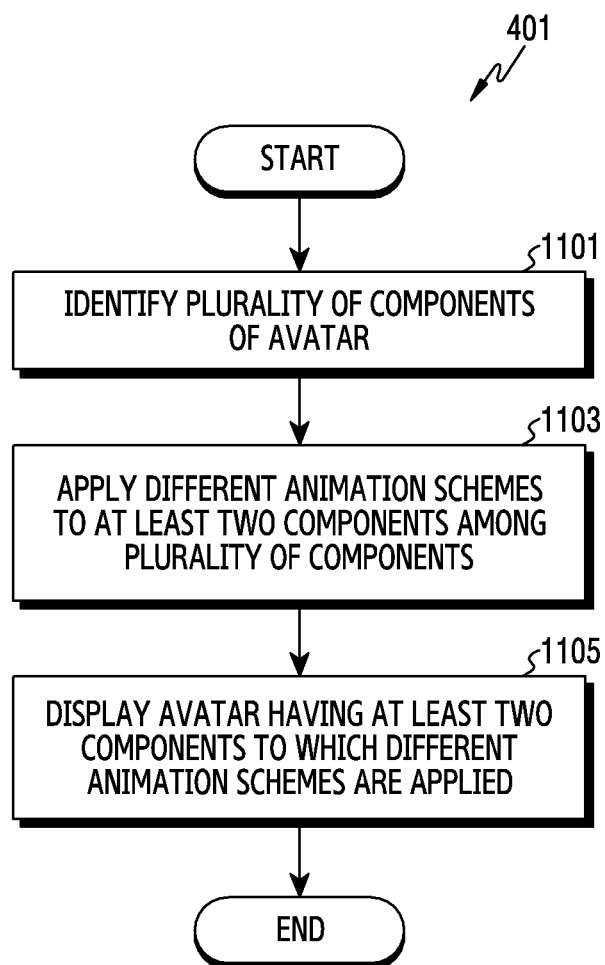
FIG. 11 is a flowchart of a method of an electronic device for applying an animation scheme to each component of an avatar according to an embodiment.

FIG. 11 is a flowchart of a method of an electronic device for applying an animation scheme to each component of an avatar according to an embodiment. The operation may be performed by the electronic device 101 of FIG. 1, the electronic device 101 of FIG. 3, or the processor 120 of the electronic device 101.

Referring to FIG. 11, steps 1101, 1103, and 1105 may be associated with step 401 of FIG. 4A.

In step 1101, the processor 120 may identify a plurality of components of the avatar. The 3D model of the avatar in the virtual space may be divided into a plurality of areas, and each of the plurality of components of the avatar may correspond to each of the areas resulting from the division.

In step 1103, the processor 120 may apply different animation schemes to at least two of the plurality of components. If different animation schemes are applied to all of the plurality of components, the plurality of components may be divided according to the animation scheme. In other words, the animation scheme may be a reference for dividing the components of the avatar. The animation schemes may include at least one of a tracking-based animation scheme, a motion-based animation scheme, and a preloaded animation scheme. The processor 120 may apply an animation scheme corresponding to each component of the avatar.

In step 1105, the processor 120 may display the avatar having at least two components to which different animation schemes are applied, on the display device 160. Each component of the avatar may be animated according to the animation scheme applied to the corresponding component, and the processor 120 may display components of the avatar moving according to the animation scheme on the display device 160.

A motion-based animation scheme may be applied to a first component among the plurality of components of the avatar. For example, a plurality of gestures for the motion-based animation scheme may be stored or configured in the memory 130 of the electronic device 101. The processor 120 may identify a gesture corresponding to a gesture of the external object among a plurality of gestures configured in the memory 130 according to the motion-based animation scheme and display the first component moving in response to the identified gesture on the display device 160. The gesture corresponding to the gesture of the external object among the plurality of gestures stored in the memory 130 may be the same as or different from the gesture of the external object. Further, if the gesture corresponding to the gesture of the external object among the plurality of gestures configured in the memory 130 does not exist, the processor 120 may display the first component such that the first component is not moving on the display device 160.

A tracking-based animation scheme may be applied to a second component of the plurality of components of the avatar. The processor 120 may extract feature points in the area of the external object corresponding to the second component according to the tracking-based animation scheme, track a change in the extracted feature points, and display the second component, which adaptively moves according to the change in the feature points, on the display device 160. More specifically, the processor 120 may extract feature points in the area of the external object corresponding to the second component according to the tracking-based animation scheme, track a change in the extracted feature points to generate a morph target, and reflect motion of the morph target in the second component so as to display the second component such that the second component is moving on the display device 160.

A preloaded animation scheme may be applied to a third component among the plurality of components of the avatar. The processor 120 may display the third component, which is displayed regardless of the gesture of the external object, on the display device 160 according to the preloaded animation scheme. For example, the processor 120 may display the third component, which is not moving (that is, the stationary third component), on the display device 160 regardless of the gesture of the external object. For example, the processor 120 may display the third component, which periodically repeats a predetermined action (for example, an idle action) or moves according to a preset pattern on the display device 160, regardless of the gesture of the external object. The processor 120 is basically in a stopped state but may display the third component performing a specific animation (for example, making a "V" sign with the fingers) in response to detection of a specific event (for example, input detected through the sensor module 176 and/or the camera 180) on the display device 160.

The same animation scheme may be applied to all of the plurality of components of the avatar. In this case, the avatar may not be divided into a plurality of components.

Figure 12:
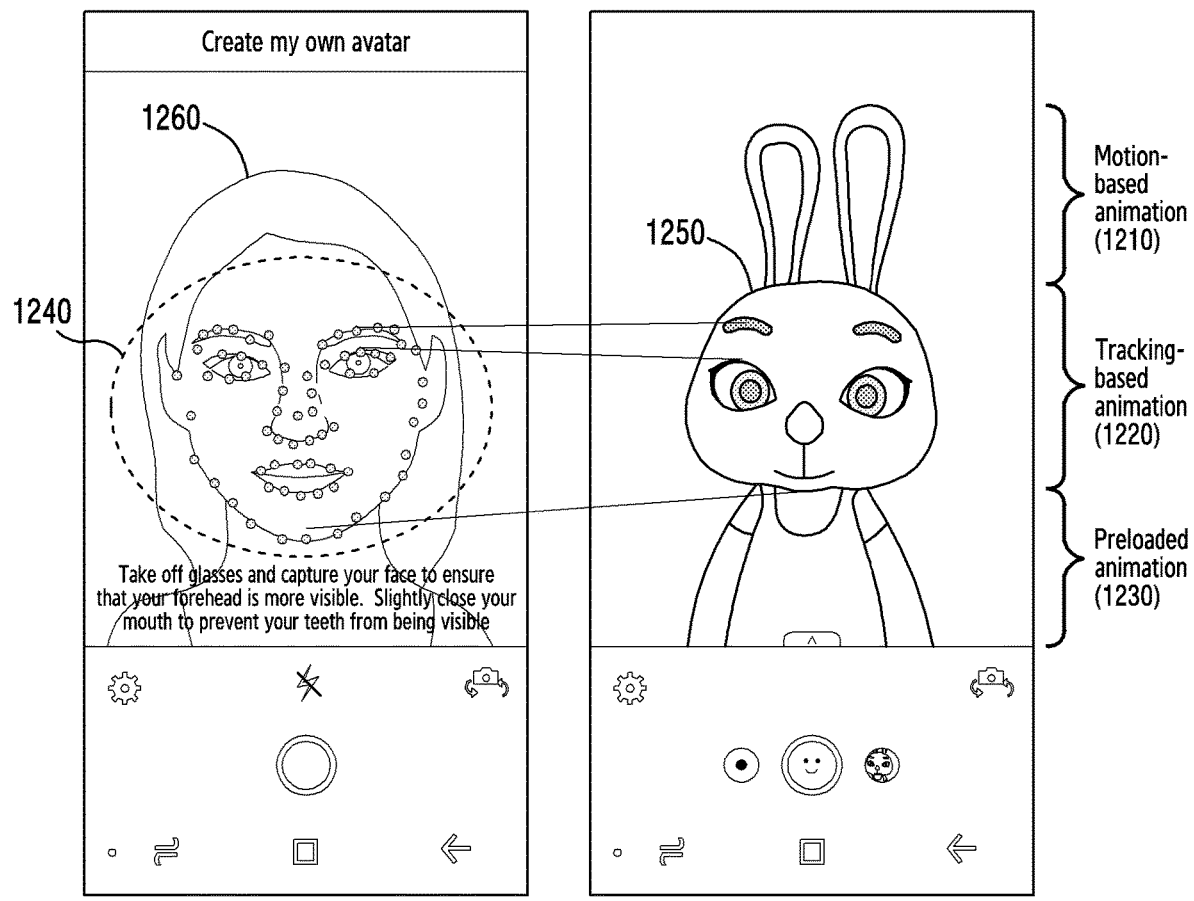
FIG. 12 is an illustration of an avatar having components to which animation schemes are applied according to an embodiment.

FIG. 12 is an illustration of an avatar having components to which animation schemes are applied according to an embodiment.

Referring to FIG. 12, a plurality of components of the avatar 1250 may include a first component 1210, a second component 1220, and a third component 1230.

A motion-based animation scheme may be applied to the first component 1210. For example, the processor 120 may identify a gesture corresponding to a gesture of an external object 1260 among a plurality of gestures configured in the memory 130 according to the motion-based animation scheme and display the first component 1210 moving according to the identified gesture on the display device 160.

A tracking-based animation scheme may be applied to the second component 1220. For example, the processor 120 may extract feature points from an area 1240 of the external object 1260 corresponding to the second component 1220 according to the tracking-based animation scheme, track a change in the extracted feature points to generate a morph target, and reflect motion of the morph target to the second component 1220 to display the second component 1220 such that the second component 1220 is moving on the display device 160.

A preloaded animation scheme may be applied to the third component 1230. For example, the processor 120 may display the third component 1230, displayed regardless of the gesture of the external object, according to the preloaded animation scheme on the display device 160. The third component 1230 may be displayed on the display device 160 in the state in which the third component 1230 is not moving, periodically repeats an idle action, moves according to a preset pattern, or performs a certain animation in response to detection of a certain event.

The avatar 1250 may be divided into a larger number of components than three components (for example, the first component 1210, the second component 1220, and the third component 1230), and different animation schemes may be applied to the respective components. In other words, the motion-based animation scheme, the tracking-based animation scheme, and the preloaded animation scheme are only examples of animation schemes, but the animation schemes are not limited thereto, and other animation schemes may also be variously defined.

Figure 13:
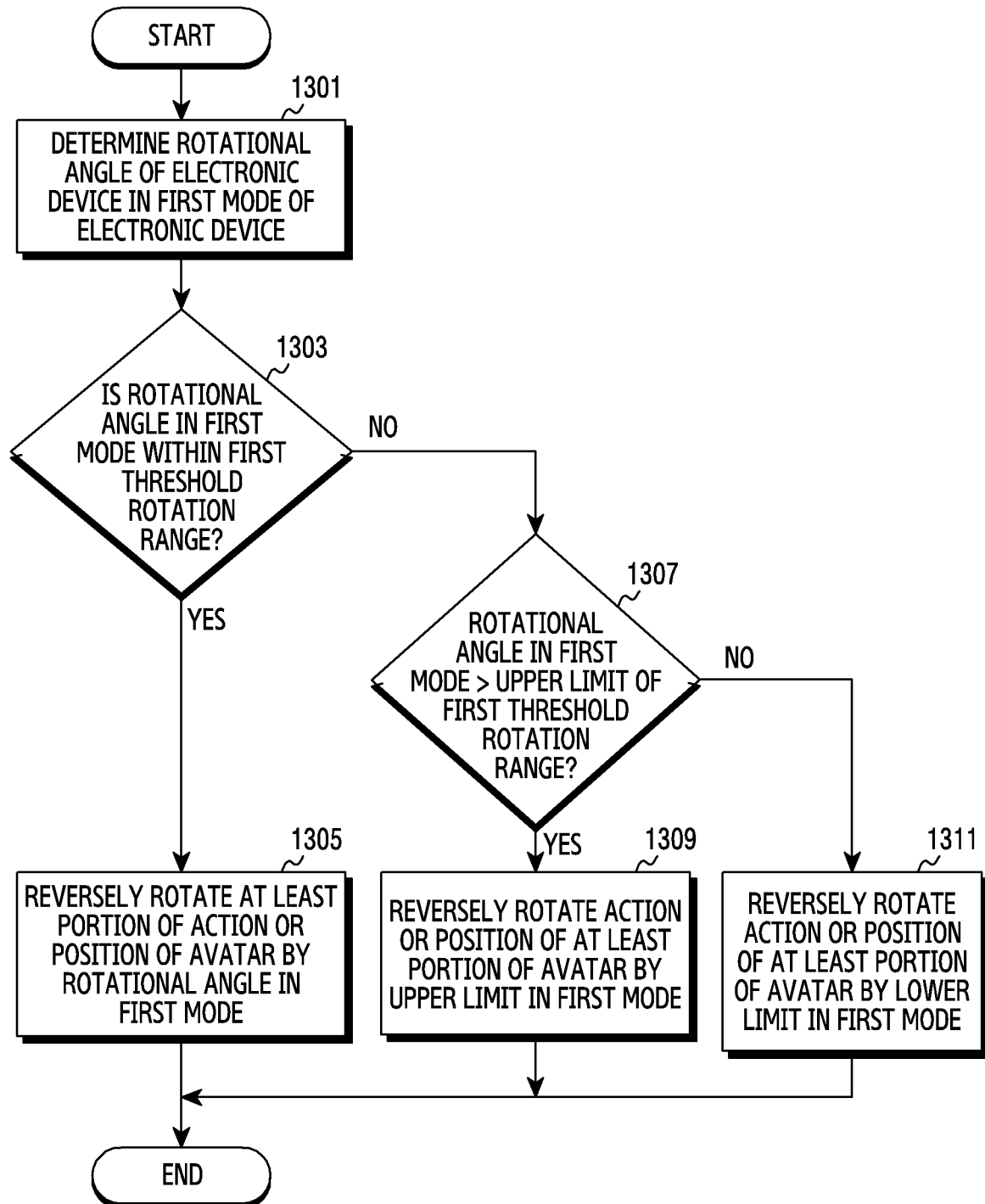
FIG. 13 is a flowchart of a method of an electronic device for rotating an avatar and displaying the rotated avatar according to an embodiment.

FIG. 13 is a flowchart of a method of an electronic device for rotating an avatar and displaying the rotated avatar according to an embodiment. The operation may be performed by the electronic device 101 of FIG. 1, the electronic device 101 of FIG. 3, or the processor 120 of the electronic device 101.

Referring to FIG. 13, in step 1301, the processor 120 may determine the rotational angle of the electronic device 101 in a first mode of the electronic device 101. The mode of the electronic device 101 may include at least one of a first mode and a second mode. For example, the first mode may be a portrait mode and the second mode may be a landscape mode. For example, the first mode may be a landscape mode and the second mode may be a portrait mode. The portrait mode and the landscape mode may be divided according to the orientation of the electronic device 101 with respect to the ground. For example, the processor 120 may determine the orientation of the electronic device 101 with respect to the ground through sensors (for example, an acceleration sensor, a gyro sensor, and a magnetic sensor) of the sensor module 176 and determine the mode of the electronic device 101 based on the orientation of the electronic device 101. The rotational angle of the electronic device 101 may be defined for each mode. For example, the rotational angle of the electronic device 101 in the portrait mode may be the angle at which the electronic device 101 rotates compared to a reference rotational angle in the portrait mode, and the reference rotational angle in the portrait mode may be the rotational angle of the electronic device 101 in the case in which shorter sides of the electronic device 160 are parallel to the ground and longer sides of the electronic device 160 are perpendicular to the ground. Further, the rotational angle of the electronic device 101 in the landscape mode may be the angle at which the electronic device 101 rotates compared to a reference rotational angle in the landscape mode, and the reference rotational angle in the landscape mode may be the rotational angle of the electronic device 101 in the case in which longer sides of the electronic device 160 are parallel to the ground and shorter sides of the electronic device 101 are perpendicular to the ground. The rotational angle may include at least one of a rotational angle in an x direction, a rotational angle in a y direction, and a rotational angle in a z direction in the 3D coordinate system. Similarly, the rotational angle of the virtual camera in the virtual space may be defined. For example, the rotational angle of the virtual camera in the virtual space may be an angle at which the virtual camera rotates compared to a reference rotational angle of the virtual camera, and the reference rotational angle of the virtual camera may be the same regardless of the mode of the electronic device 101. The reference rotational angle of the virtual camera may be a rotational angle in the case in which a rotational transform is not applied in the 3D virtual coordinate system.

In step 1303, the processor 120 may determine whether the rotational angle is within a first threshold rotation range in the first mode. For example, the processor 120 may determine the rotational angle of the electronic device 101 in the first mode through at least one sensor of the sensor module 176 and determine whether the determined rotational angle in the first mode is within the first threshold rotation range. If the rotational angle in the first mode is within the first threshold rotation range, the processor 120 may perform step 1305. Otherwise, if the rotational angle in the first mode is outside of the first threshold rotation range, the processor 120 may perform step 1307.

In step 1305, the processor 120 may reversely rotate at least a portion of the action or the position of the avatar by the rotational angle in the first mode. In other words, the processor 120 may display the avatar reversely rotated by the rotational angle in the first mode through the display device 160 by rotating the virtual camera by the rotational angle in the first mode. The processor 120 may rotate the virtual camera in the virtual space by the rotational angle in the first mode and display an image of the virtual space (in which the image of the virtual space may include an avatar and/or a background) captured by the rotated virtual camera on the display device 160. In other words, if the rotational angle of the electronic device 101 in the first mode increases within the first threshold rotation range, the processor 120 may increase the rotational angle of the avatar displayed on the display device 160 in the opposite direction.

in step 1307, the processor 120 may determine whether the rotational angle of the electronic device 101 in the first mode is greater than an upper limit of the first threshold rotation range. If the rotational angle in the first mode is greater than the upper limit of the first threshold rotation range, the processor 120 may perform step 1309. Otherwise, if the rotational angle in the first mode is less than or equal to a lower limit of the first threshold rotation range, the processor 120 may perform step 1311.

In step 1309, the processor 120 may reversely rotate at least a portion of the action or the position of the avatar by the upper limit in the first mode. In other words, the processor 120 may display the avatar reversely rotated by the upper limit in the first mode on the display device 160 by rotating the virtual camera by the upper limit of the first threshold rotation range. The processor 120 may rotate the virtual camera in the virtual space by the upper limit of the first threshold rotation range and display an image of the virtual space (the image of the virtual space may include an avatar and/or a background) captured by the rotated virtual camera on the display device 160. In other words, under the condition that the rotational angle of the electronic device 101 in the first mode is greater than the upper limit of the first threshold rotation range, even though the rotational angle of the electronic device 101 increases, the processor 101 may maintain the rotational angle of the avatar displayed on the display device 160 as the upper limit of the first threshold rotation range without increasing the rotational angle. Accordingly, it is possible to reduce distortion of the avatar due to excessive rotation of the avatar and improve user experience.

In step 1311, the processor 120 may reversely rotate at least a portion of the action or the position of the avatar by the lower limit in the first mode. In other words, the processor 120 may display the avatar reversely rotated by the lower limit in the first mode on the display device 160 by rotating the virtual camera by the lower limit of the first threshold rotation range. The processor 120 may rotate the virtual camera in the virtual space by the lower limit of the first threshold rotation range and display an image of the virtual space (e.g., the image of the virtual space may include an avatar and/or a background) captured by the rotated virtual camera through the display device 160. In other words, under the condition that the rotational angle of the electronic device 101 in the first mode is greater than the lower limit of the first threshold rotation range, even though the rotational angle of the electronic device 101 decreases, the processor 101 may maintain the rotational angle of the avatar displayed on the display device 160 as the lower limit of the first threshold rotation range, without decreasing the rotational angle. Accordingly, it is possible to reduce distortion of the avatar due to excessive rotation of the avatar and improve user experience.

Figure 14A:
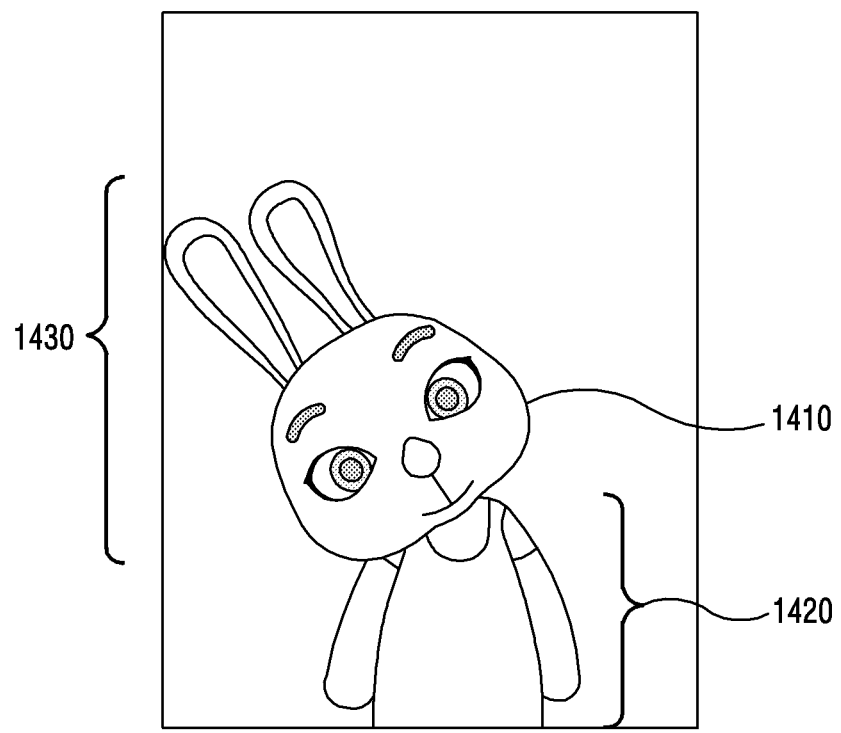
FIG. 14A is an illustration of a case in which at least a portion of an avatar is rotated according to an embodiment.
Figure 14B:
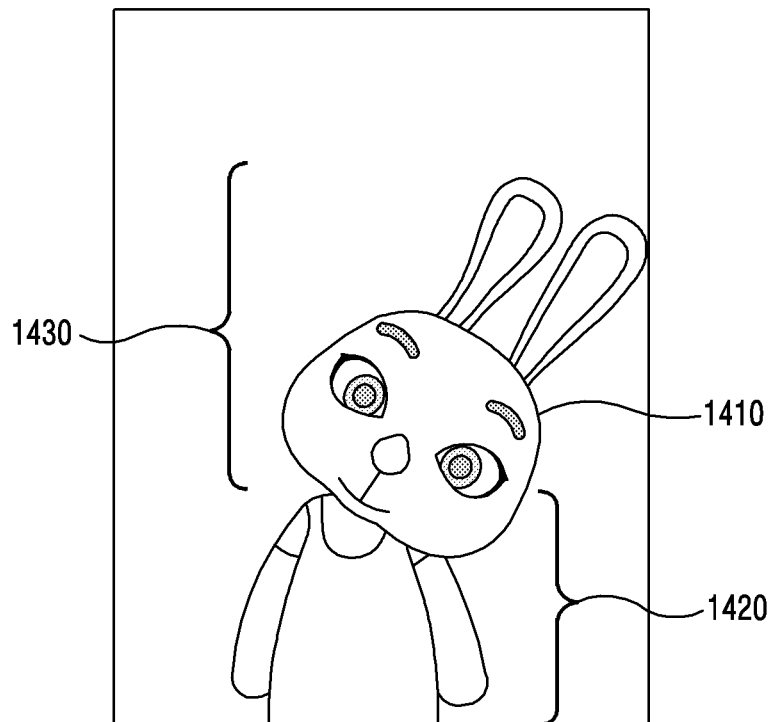
FIG. 14B is an illustration of a case in which at least a portion of an avatar is rotated according to an embodiment.

FIG. 14A is an illustration of a case in which at least a portion of an avatar is rotated according to an embodiment, and FIG. 14B is an illustration of a case in which at least a portion of an avatar is rotated according to an embodiment.

Referring to FIG. 14A, the processor 120 may display an avatar 1410 reversely rotated by a lower limit of a first threshold rotation range on the display device 160. In other words, the processor 120 may rotate the virtual camera by the lower limit of the first threshold rotation range in the virtual space. In this case, under the condition that the rotational angle of the electronic device 101 is less than or equal to the lower limit of the first threshold rotation range, even though the rotational angle of the electronic device 101 decreases, the processor 120 may maintain the rotational angle of the avatar 1410 without decreasing the rotational angle, and may thus reduce distortion of the avatar 1410 attributable to excessive rotation of the avatar 1410.

Referring to FIG. 14B, the processor 120 may display the avatar 1410 reversely rotated by the upper limit of the first threshold rotation range on the display device 160. In other words, the processor 120 may rotate the virtual camera by the upper limit of the first threshold rotation range in the virtual space. In this case, under the condition that the rotational angle of the electronic device 101 is less than or equal to the lower limit of the first threshold rotation range, even though the rotational angle of the electronic device 101 decreases, the processor 120 may maintain the rotational angle of the avatar 1410 without increasing the rotational angle, and may reduce distortion of the avatar 1410 due to excessive rotation of the avatar 1410.

The processor 120 may display the avatar 1410 rotated by the rotational angle within the first threshold rotation range on the display device 160. For example, if the rotational angle of the electronic device 101 is within the first threshold rotation range, the processor 120 may display the avatar 1410 reversely rotated by the rotational angle of the electronic device 101 on the display device 160.

Some components of the avatar 1410 may not be rotated regardless of the rotational angle of the electronic device 101. For example, the processor 120 may rotate a head part 1430 of the avatar 1410 but may not rotate a body part 1420 of the avatar 1410 according to rotation of the electronic device 101. A component of the avatar 1410 rotated according to rotation of the electronic device 101 may be determined based on animation schemes applied to components of the avatar 1410. For example, a preloaded animation scheme may be applied to the body part 1420, and the processor 120 may not rotate the component of the avatar 1410 to which the preloaded animation scheme is applied.

Figure 15:
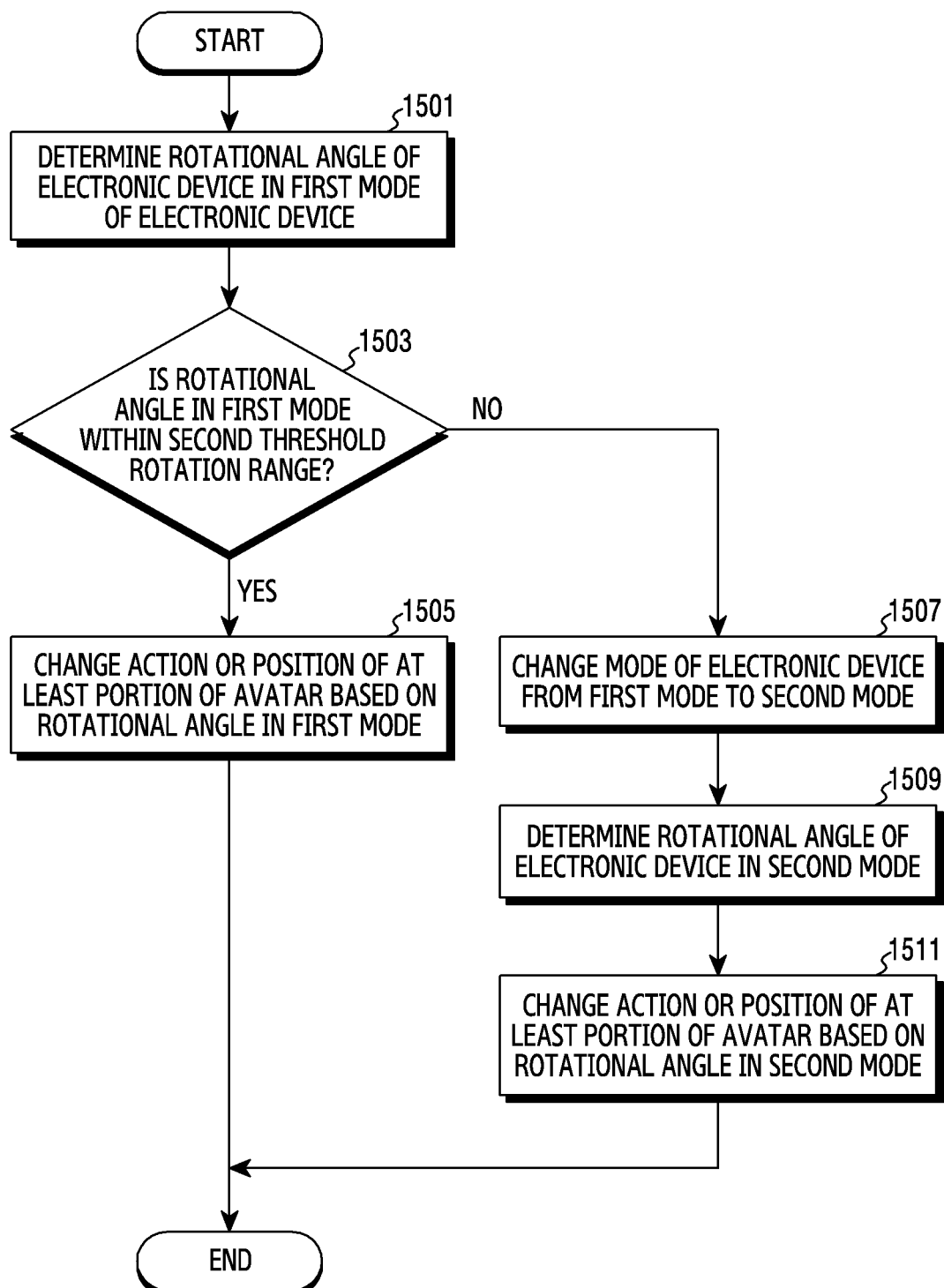
FIG. 15 is a flowchart of a method of an electronic device for determining rotation of an avatar and a mode of the electronic device based on rotation of the electronic device according to an embodiment.

FIG. 15 is a flowchart of a method of an electronic device for determining rotation of an avatar and a mode of the electronic device based on the electronic device according to an embodiment.

Referring to FIG. 15, in step 1501, the processor 120 may determine the rotational angle of the electronic device 101 in a first mode of the electronic device 101. The processor 120 may determine the rotational angle of the electronic device 101 in the first mode through one or more sensors (for example, an acceleration sensor, a gyro sensor, and a magnetic sensor) of the sensor module 176. The mode of the electronic device 101 may include at least one of a first mode and a second mode. For example, the first mode may be a portrait mode and the second mode may be a landscape mode. For example, the first mode may be a landscape mode and the second mode may be a portrait mode.

In step 1503, the processor 120 may determine whether the rotational angle in the first mode is within a second threshold rotation range. If the rotational angle in the first mode is within the second threshold rotation range, the processor 120 may perform step 1505. Otherwise, if the rotational angle in the first mode is outside of the second threshold rotation range, the processor 120 may perform step 1507.

In step 1505, the processor 120 may change at least a portion of the action or the position of the avatar based on the rotational angle in the first mode. In other words, the processor 120 may display the rotated avatar based on the rotational angle in the first mode. For example, the processor 120 may determine whether the rotational angle in the first mode is within the first threshold rotation range, as in step 1303 of FIG. 13, perform steps subsequent to step 1303 according to the result thereof, and display the rotated avatar on the display device 160.

In step 1507, the processor 120 may change the mode of the electronic device 101 from the first mode to the second mode. In other words, the processor 120 may change the mode of the electronic device 101 when the rotational angle in the first mode deviates from the second threshold rotation range. An upper limit and a lower limit of the second threshold rotation range may be threshold values for changing the mode of the electronic device 101 (or for determining the change in the mode of the electronic device 101).

In step 1509, the processor 120 may determine the rotational angle of the electronic device in the second mode. The processor 120 may determine that a reference rotational angle has been changed according to the change in the mode, and may determine the rotational angle of the electronic device 101 in the second mode based on the changed reference rotational angle. For example, the processor 120 may determine the angle at which the electronic device 101 rotates with respect to the reference rotational angle in the second mode through one or more sensors of the sensor module 176. For example, the processor 120 may reflect the amount of the change in the reference rotational angle between the first mode and the second mode in the rotational angle of the electronic device 101 in the first mode and determine the rotational angle of the electronic device 101 in the second mode.

In step 1511, the processor 120 may change at least a portion of the action or the position of the avatar based on the rotational angle in the second mode. In other words, the processor 120 may display the rotated avatar based on the rotational angle in the second mode. For example, the processor 120 may determine whether the rotational angle in the second mode is within the first threshold rotation range, as in step 1303 of FIG. 13, perform operations after step 1303 according to the result thereof, and display the rotated avatar on the display device 160.

The first threshold rotation range may be included in the second threshold rotation range.

The second threshold rotation range may be included in the first threshold rotation range.

The upper limit and the lower limit of the first threshold rotation range may be less than the upper limit and the lower limit of the second threshold rotation range, respectively.

The upper limit and the lower limit of the first threshold rotation range may be greater than the upper limit and the lower limit of the second threshold rotation range, respectively.

The first threshold rotation range may be the same as the second threshold rotation range.

Figure 16:
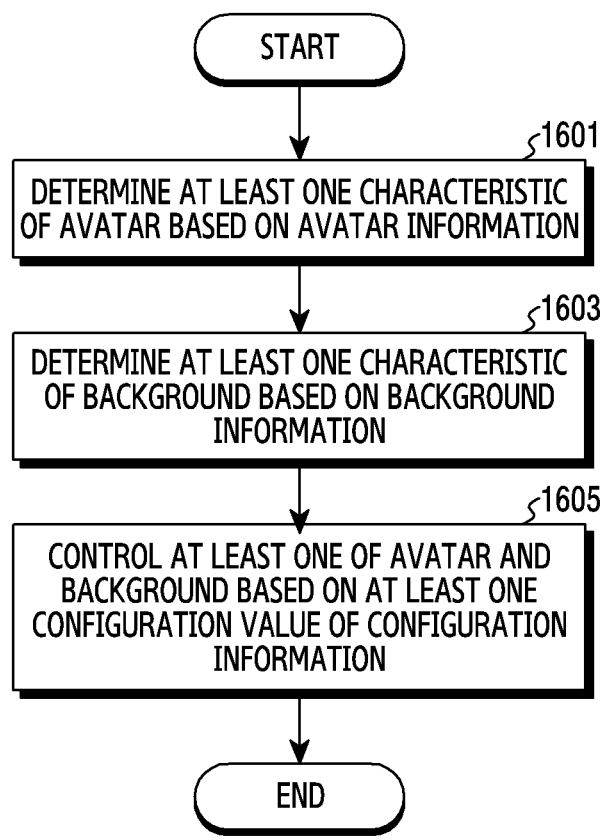
FIG. 16 is a flowchart of a method of an electronic device using an avatar database (DB) according to an embodiment.

FIG. 16 is a flowchart of a method of an electronic device using an avatar DB according to an embodiment. The operation may be performed by the electronic device 101 of FIG. 1, the electronic device 101 of FIG. 3, or the processor 120 of the electronic device 101.

Referring to FIG. 16, in step 1601, the processor 120 may determine at least one characteristic of the avatar based on avatar information stored in the memory 130. For example, the avatar information may be included in an avatar DB 330 stored in the memory 130. The characteristic of the avatar may include at least one of an avatar model, a color applied to the avatar model, a normal map of the avatar, a material of the avatar model, a texture of the avatar, illumination of the avatar, and an animation effect defined for each avatar.

In step 1603, the processor 120 may determine at least one characteristic of the background based on background information stored in the memory 130. For example, the background information may be included in the avatar DB 330 stored in the memory 130. The characteristic of the background may include at least one of 2D background image(s), 3D background image(s), and a method of mapping a 2D background image to a 3D figure (for example, a cuboid, a spherical polyhedron, or other polyhedra).

In step 1605, the processor 120 may control at least one of the avatar and the background based on a configuration value of at least one piece of configuration information stored in the memory 130. For example, the configuration information may be included in the avatar DB 330 stored in the memory 130. The configuration value of the configuration information may include at least one of an action of the avatar (for example, leftward movement, rightward movement, forward movement, backward movement, and rotation of the avatar), ambient light of the avatar, a method of displaying a background image (for example, a 2D background image or a 3D background image), an initial position of the virtual camera in the virtual space, and sensitivity of avatar motion for sensing information.

The processor 120 may apply determined characteristics to the avatar and the background, control the avatar and the background of the corresponding characteristics according to the configuration value, and display the avatar and the background on the display device 160.

The processor 120 may determine at least one of the characteristic of the avatar, the characteristic of the background, and the configuration value based on input received through the input device 150. In other words, the characteristics of the avatar, the characteristics of the background, and the configuration value may be selected based on the input.

Figure 17:
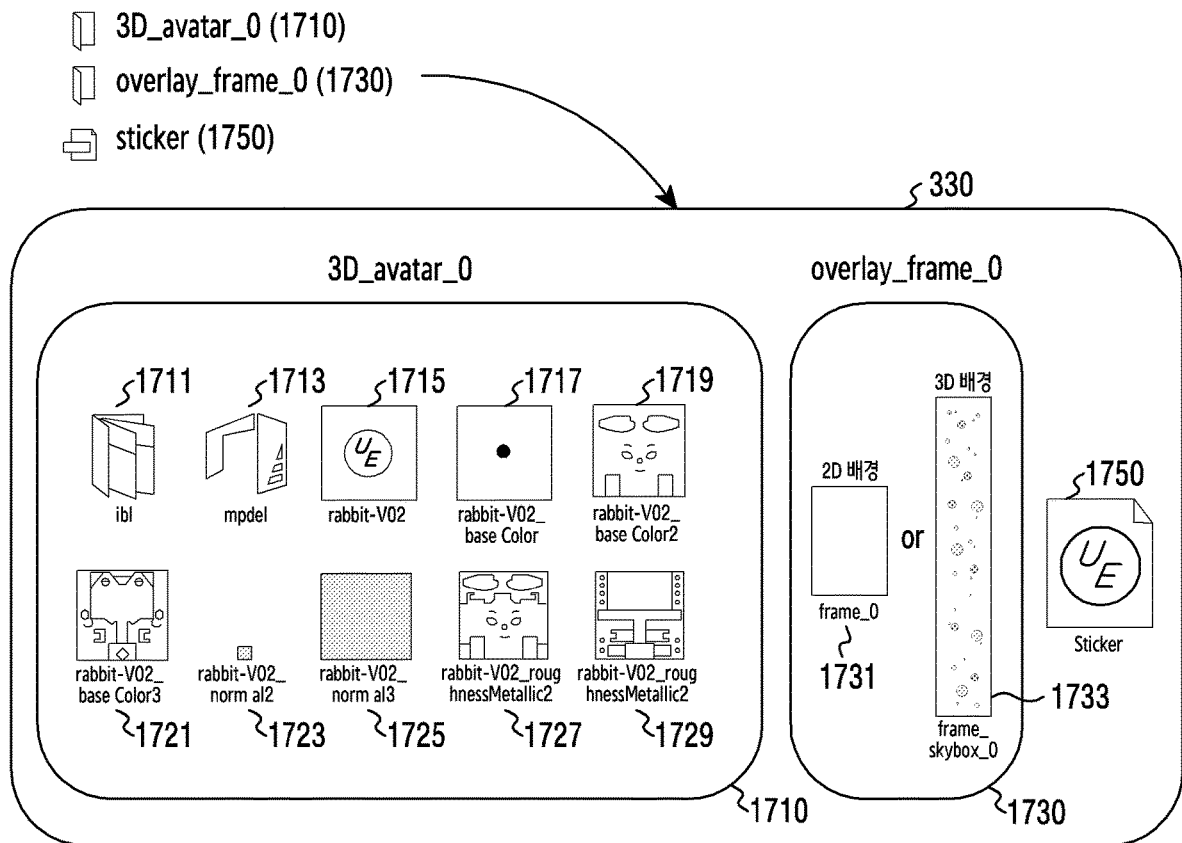
FIG. 17 is an illustration of an avatar DB according to an embodiment.

FIG. 17 is an illustration of a structure of the avatar DB 330 according to an embodiment.

Referring to FIG. 17, the avatar DB 330 may include 3D_avatar_1710, overlay_frame_0 1730, and a sticker 1750. 3D_avatar_0 1710 may correspond to avatar information, overlay_frame_0 1730 may correspond to background information, and the sticker 1750 may correspond to configuration information.

3D_avatar_0 1710 may include a plurality of information elements 1711, 1713, 1715, 1717, 1719, 1721, 1723, 1725, 1727, and 1729. The information elements 1711, 1713, 1715, 1717, 1719, 1721, 1723, 1725, 1727, and 1729 may include at least one piece of information for determining an avatar model, information for determining a color to be applied to the avatar model, information for determining a normal map for the avatar, information for determining a material of the avatar model, information for determining a texture of the avatar, information for determining illumination of the avatar, and an animation effect for the avatar.

Overlay_frame_0 1730 may include a 2D background image 1731 and a 3D background image 1730. The background information may further include information on a method of mapping a 2D background image to a 3D figure.

The sticker 1750 may include at least one configuration value for controlling at least one of the avatar and the background. The configuration value may include at least one of an action of the avatar (for example, leftward movement, rightward movement, forward movement, backward movement, and rotation of the avatar), ambient light of the avatar, a method of displaying a background image (for example, a 2D background image or a 3D background image), an initial position of the virtual camera in the virtual space, and a sensitivity of avatar motion for sensing information. A method of describing the configuration value is described below in greater detail with reference to FIG. 19.

Figure 18A:
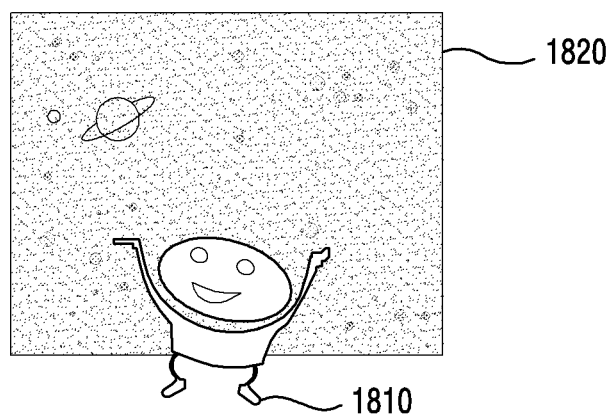
FIG. 18A is an illustration of a background image determined from background information according to an embodiment.
Figure 18B:
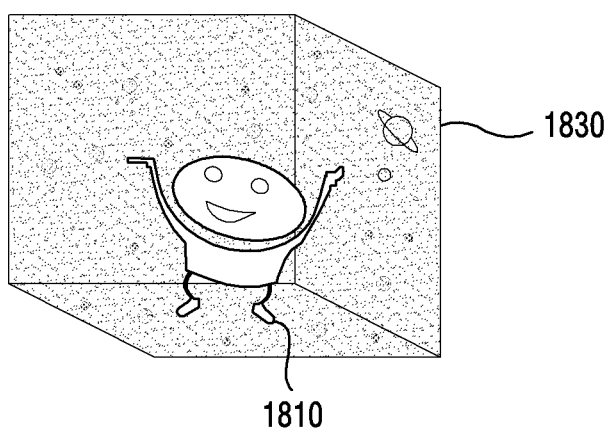
FIG. 18B is an illustration of a background image determined from background information according to an embodiment.
Figure 18C:
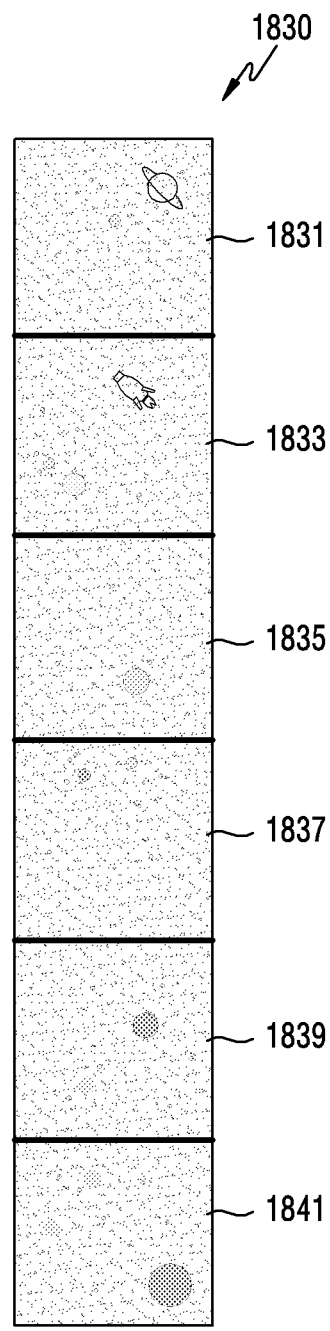
FIG. 18C is an illustration of a background image determined from background information according to an embodiment.

FIG. 18A is an illustration of a background image determined from background information according to an embodiment, FIG. 18B is an illustration of a background image determined from background information according to an embodiment, and FIG. 18C is an illustration of a background image determined from background information according to an embodiment.

Referring to FIG. 18A, the processor 120 may dispose a 2D plane in a 3D space and display a 21) image on the 2D plane through the display device 160 so as to display a background. In other words, the processor 120 may display a flat background 1820 on the display device 160. The processor 120 may configure the flat background 1820 based on background information, render an avatar 1810 in the flat background 1820, and provide the flat background 1820 and the avatar 1810 together through the display device 160.

Referring to FIG. 18B, the processor 120 may dispose 2D planes in a cube form in a 3D space and display 2D images on the respective 2D planes through the display device 160 so as to display a background 1830. In other words, the processor 1820 may display the background 1830 in a cube map form on the display device 160. The processor 120 may configure the background 1830 in the cube map form based on background information, render the avatar 1810 in the background 1830, and provide the background 1830 and the avatar 1810 together through the display device 160.

Referring to FIG. 18C, the processor 120 may configure the background 1830 in the cube map form based on 2D background images 1831, 1833, 1835, 1837, 1839, and 1841 disposed on respective faces of the cube. The 2D background images 1831, 1833, 1835, 1837, 1839, and 1841 may be included in background information. The 2D background images 1831, 1833, 1835, 1837, 1839, and 1841 may be selected based on input received through the input device 150. The processor 120 may map the 2D background images 1831, 1833, 1835, 1837, 1839, and 1841 on respective faces of the cube according to background information and configure the background 1830 in the cube map form.

The background of the avatar 1810 (for example, the background 1820 and the background 1830) may be changed based on at least one of a position, motion, an action state, or a facial expression of the avatar (or the external object). The processor 120 may determine at least one of the position, the motion, the action state, and the facial expression of the avatar (or the external object) and change the background based on the determined elements. For example, the processor 120 may change at least some of the 2D background images 1831, 1833, 1835, 1837, 1839, and 1841 based on at least one of the position, the motion, the action state, and the facial expression of the avatar (or the external object), configure the background 1830 in the cube map form based on the changed 2D background images, and provide the configured background 1830 together with the avatar 1810.

Figure 19:
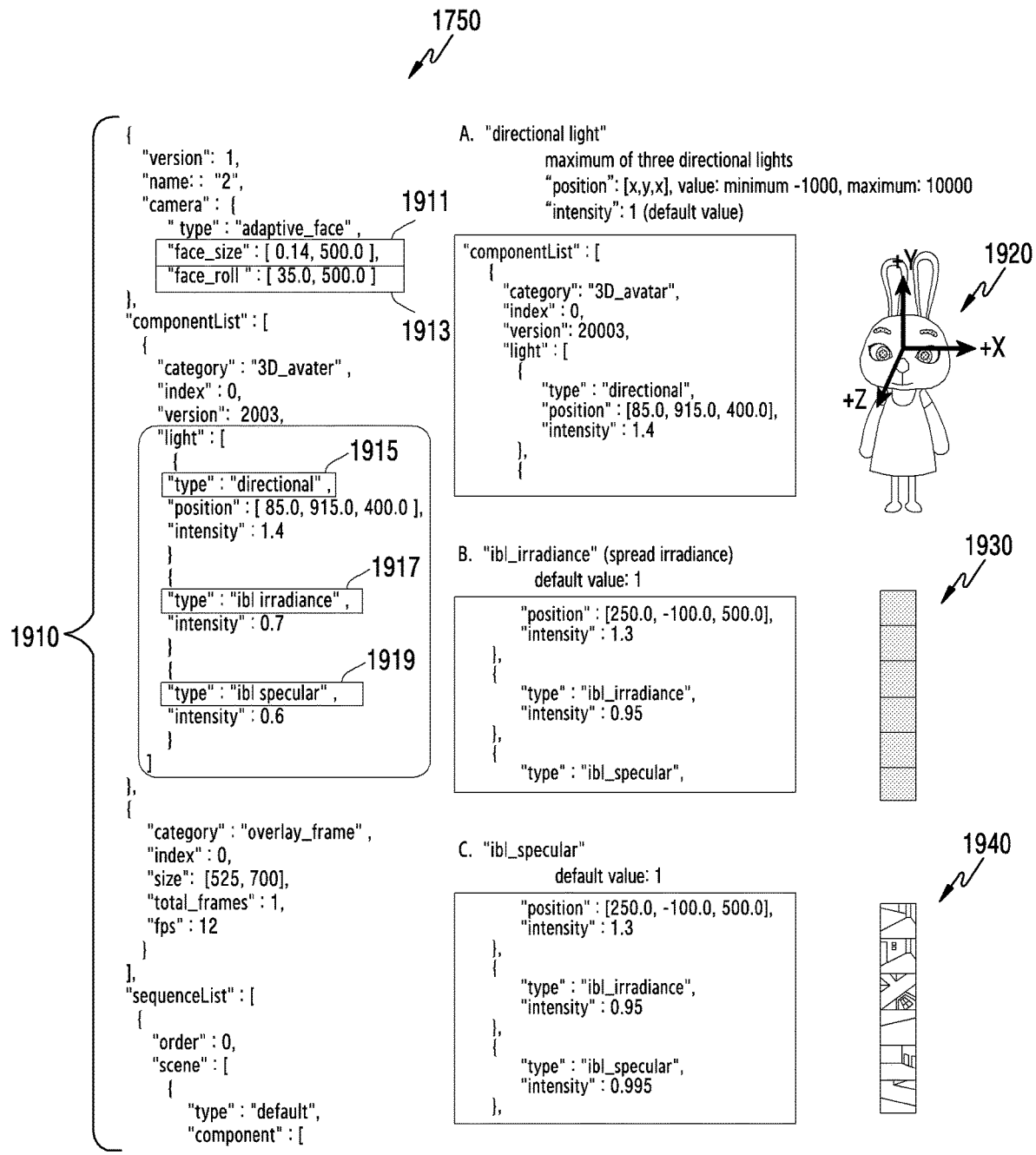
FIG. 19 is an illustration of a method of describing configuration information according to an embodiment.

FIG. 19 is an illustration of a method of describing configuration information according to an embodiment.

Referring to FIG. 19, configuration information (for example, the sticker 1750) may include a description area 1910 in which configuration values are described. For example, configuration values 1911, 1913, 1915, 1917, and 1919 are described in the description area 1910.

The configuration value 1911 may be expressed as "face_size":[0.14, 500.0]. If the ratio of an area of a portion of the external object (for example, a user's face) to an area of a camera preview displayed by the display device 160 is less than 0.14 (that is, if the displayed size of the avatar is very small), "face_size":[0.14, 500.0] may indicate that the processor 120 displays the camera preview without displaying the avatar for 500 ms. For example, if the ratio of an area of a portion of the external object (for example, a user's face) to an area of a camera preview displayed by the display device 160 is less than 0.14 (that is, if the displayed size of the avatar is very small), "face_size":[0.14, 500.0] may indicate that the processor 120 does not analyze the camera preview for 500 ms (e.g., the analysis of the camera preview may be used to move the avatar), stops additional motion of the avatar, or stops motion of a component of the avatar (for example, a component corresponding, to a user's face). If the ratio becomes greater than 0.14, the processor 120 may display the avatar and the background again through the display device 160 but may not display the camera preview.

The configuration value 1913 may be expressed as"face_roll":[35.0, 500.0]. If the rotational angle of the electronic device 101 in a specific mode (for example, a portrait mode or a landscape mode) is greater than or equal to 35 degrees, "face_roll":[35.0, 500.0] may indicate that the processor 120 does not display the avatar and/or the background for 500 ms. For example, if the rotational angle of the electronic device 101 in a specific mode (for example, a portrait mode or a landscape mode) is greater than or equal to 35 degrees, "face_roll":[35.0, 500.0] may indicate that the processor 120 does not analyze the camera preview for 500 ms (e.g., the analysis of the camera preview may be used to move the avatar), stops additional motion of the avatar, or stops motion of a component of the avatar (for example, a component corresponding to a user's face). If the mode of the electronic device 101 is changed according to rotation of the electronic device 101, the processor 120 may gradually display the avatar and/or the background for 500 ms in the changed mode.

The configuration value 1915 may be expressed as "type": "directional". "type":"directional" may indicate that the processor 120 applies direct light to, for example, the avatar 1920. The processor 120 may apply direct light having an intensity of 1.4 to a position corresponding to virtual coordinates (85.0, 915.0, 400.0) of the avatar 1920 based on other configuration values "position": [35.0, 915.0, 400.0] and "intensity":1.4 described in the description area 1910 in addition to "type":"directional".

The configuration value 1917 may be expressed as "type": "ibl_irradiance". "type":"ibl_irradiance" may indicate that the processor 120 configures irradiance in the background 1930. The processor 120 may apply irradiance having an intensity of 0.7 to the background 1930 based on another configuration value of "intensity":0.7 described in the description area 1910 in addition to "type":"ibl_irradiance". The configuration value 1917 may be applied not only to the background 1930 but also to an image customized by the user.

The configuration value 1919 may be expressed as "type": "ibl_specular". "type":"ibl_specular" may indicate that the processor 120 applies reflection (specular) to the background 1940. The processor 120 may apply reflection having an intensity of 0.6 to the background 1940 based on another configuration value of "intensity":0.6 described in the description area 1910 in addition to "type":"ibl_specular". The configuration value 1919 may be applied not only to the background 1940 but also to a customized image by the user.

The configuration information may include an upper limit and a lower limit of a threshold distance range. For example, the upper limit and the lower limit of the threshold distance range may be described in the description area 1910.

The configuration information may include an upper limit and a lower limit in a first threshold rotation range. For example, the upper limit and the lower limit of the first threshold rotation range may be described in the description area 1910.

The configuration information may include an upper limit and a lower limit of a second threshold rotation range. For example, the upper limit and the lower limit of the second threshold rotation range may be described in the description area 1910.

According to an embodiment, a method of operating an electronic device (for example, the electronic device 101) includes an operation of displaying an avatar corresponding to an external object included in one or more images acquired using the camera of the electronic device, an operation of identifying a change in a position of the external object relative to the electronic device, an operation of determining a viewpoint related to the displayed avatar based on the change in the position, and an operation of displaying the avatar displayed based on the determined viewpoint.

The operation of displaying the avatar displayed based on the determined viewpoint may include an operation of determining attributes of a background of the avatar based on the positional relationship therebetween and an operation of providing the background and the avatar together according to the attributes.

The attributes of the background may include a blur effect of the background, and the operation of determining the attributes of the background of the avatar may include an operation of decreasing the blur effect of the background if the distance between the external object and the electronic device increases and an operation of increasing the blur effect of the background if the distance between the external object and the electronic device decreases.

The operation of displaying the avatar displayed based on the determined viewpoint may include an operation of extracting feature information related to a face of a user of the electronic device identified in the one or more images and an operation of generating the avatar reflecting the characteristics of the face of the user based on the feature information and an avatar generation model.

The operation of displaying the avatar based on the determined viewpoint may include an operation of decreasing the size of the avatar and the background of the avatar displayed through the display if the distance between the external object and the electronic device increases and an operation of increasing the size of the avatar and the background of the avatar displayed through the display if the distance between the external object and the electronic device decreases.

The operation of determining the viewpoint related to the displayed avatar may include an operation of determining whether a distance between the external object and the electronic device is within a threshold distance ranee, an operation of determine that the viewpoint is a position in the virtual space corresponding to the distance between the external object and the electronic device if the distance between the external object and the electronic device is within the threshold distance range, an operation of determining that the viewpoint is a position in the virtual space corresponding to an upper limit if the distance between the external object and the electronic device is greater than or equal to the upper limit of the threshold distance range, and an operation of determining that the viewpoint is a position in the virtual space corresponding to a lower limit if the distance between the external object and the electronic device is less than or equal to the lower limit of the threshold distance range.

The operation of determining that the viewpoint is the position in the virtual space corresponding to the lower limit may include an operation of, if the distance between the external object and the electronic device is less than or equal to the lower limit of the threshold distance range, displaying an area of the avatar corresponding to an area of the external object, which is not captured by the camera, as a default avatar image on the display.

The operation of displaying the avatar displayed based on the determined viewpoint may include an operation of determining a view area in the background of the avatar based on the position and an operation of providing the view area in the background together with the avatar.

The operation of determining the view area in the background of the avatar may include an operation of determining the angle at which the electronic device moves with respect to the external object and a direction of the angle and an operation of moving the view area in the background by the angle in a direction opposite the direction.

The operation of displaying the avatar displayed based on the determined viewpoint may include an operation of determining a view area in the avatar based on the position and an operation of providing the view area in the avatar.

The operation of determining the view area in the avatar may include an operation of determining an angle at which the electronic device moves with respect to the external object and a direction of the angle and an operation of moving the view area in the avatar by the angle in the direction.

The operation of displaying the avatar corresponding to the external object included in the one or more images acquired using the camera of the electronic device may include an operation of identifying a plurality of components of the avatar, an operation of applying different animation schemes to at least two components of the plurality of components, and an operation of displaying the avatar having the at least two components, to which the different animation schemes are applied.

The different animation schemes may include a motion-based animation scheme applied to a first component among the plurality of components, and the operation of displaying the avatar may include an operation of identifying a gesture corresponding to a gesture of the external object among a plurality of gestures configured in the electronic device according to the motion-based animation scheme and an operation of displaying the first component, moving according to the identified gesture.

The different animation schemes may include a tracking-based animation scheme applied to a second component among the plurality of components, and the operation of displaying the avatar may include an operation of tracking a change in feature points extracted from the area of the external object corresponding to the second component according to the tracking-based animation scheme and an operation of displaying the second component adaptively moving according to the change in the feature points.

The different animation schemes may include a preloaded animation scheme applied to a third component among the plurality of components, and the operation of displaying the avatar may include an operation of displaying the third component, displayed regardless of a gesture of the external object, according to the preloaded animation scheme through the display.

According to an embodiment, a method of operating the electronic device includes an operation of determining a rotational angle of the electronic device in a first mode of the electronic device, an operation of determining whether the rotational angle in the first mode is within a first threshold rotation range, an operation of reversely rotating at least a portion of an action or a position of the avatar by the rotational angle in the first mode if the rotational angle in the first mode is within the first threshold rotation range, an operation of reversely rotating at least a portion of an action or a position of the avatar by an upper limit in the first mode if the rotational angle in the first mode is greater than or equal to the upper limit of the first threshold rotation range, and an operation of reversely rotating at least a portion of an action or a position of the avatar by a lower limit in the first mode if the rotational angle in the first mode is less than or equal to the lower limit of the first threshold rotation range, and the first mode may be one of a portrait mode and a landscape mode.

According to an embodiment, a method of operating the electronic device includes an operation of determining the rotational angle of the electronic device in a first mode of the electronic device, an operation of determining whether the rotational angle in the first mode is within a second threshold rotational angle, an operation of changing at least a portion of an action or a position of the avatar based on the rotational angle in the first mode if the rotational angle in the first mode is within the second threshold rotation range, and an operation of changing the mode of the electronic device from the first mode to a second mode and changing at least a portion of an action or a position of the avatar based on the rotational angle in the second mode if the rotational angle in the first mode is outside of the second threshold rotation range, and the first mode may be one of a portrait mode and a landscape mode and the second mode may be the other of the portrait mode and the landscape mode.

According to an embodiment, a method of operating an electronic device includes an operation of determining at least one characteristic of the avatar based on avatar information stored in a memory of the electronic device, an operation of determining at least one characteristic of the background based on background information stored in the memory, an operation of controlling at least one of the avatar and the background displayed through the display based on at least one configuration value of configuration information stored in the memory, and an operation of displaying at least one of the controlled avatar and background, and the avatar may correspond to an external object included in one or more images acquired using a camera of the electronic device.

The method of operating the electronic device may further include an operation of determining at least one of the at least one characteristic of the avatar, the at least one characteristic of the background, and the at least one configuration value based on an input received through the input device.

The configuration information may include an upper limit and a lower limit of a threshold distance range, and the method of operating the electronic device may further include an operation of determining that a viewpoint related to the avatar in a virtual space is a position in the virtual space corresponding to a distance between the external object and the electronic device if the distance between the external object and the electronic device is within the threshold distance range, an operation of determining that the viewpoint is a position in the virtual space corresponding to an upper limit if the distance between the external object and the electronic device is greater than or equal to the upper limit, and an operation of determining that the viewpoint is a position in the virtual space corresponding to a lower limit if the distance between the external object and the electronic device is less than or equal to the lower limit.

The configuration information may include an upper limit and a lower limit of a first threshold rotation range, and the method of operating the electronic device may include an operation of changing at least a portion of an action or a position of the avatar by a rotational angle in a first mode if the rotational angle of the electronic device in the first mode of the electronic device is within the first threshold rotation range, an operation of changing at least the portion of the action or the position of the avatar by an upper limit in the first mode if the rotational angle in the first mode is greater than or equal to the upper limit, and an operation of reversely changing at least the portion of the action or the position of the avatar by a lower limit in the first mode if the rotational angle in the first mode is less than or equal to the lower limit, and the first mode may be one of a portrait mode and a landscape mode.

Methods stated in the appended claims and/or disclosure according to various embodiments may be implemented by hardware, software, or a combination of hardware and software.

When the methods are implemented by software, a non-transitory computer-readable storage medium for storing one or more programs (software modules) may be provided. The one or more programs stored in the non-transitory computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory (RAM) and a flash memory, a read only memory (ROM), an electrically erasable programmable ROM (EEPROM), a magnetic disc storage device, a compact disc-ROM (CD-ROM), digital versatile discs (DVDs), or other types of optical storage devices, or a magnetic cassette. Alternatively, any combination of some or all of the storage devices may form a memory in which the program is stored. Further, a plurality of such memories may be included in the electronic device.

In addition, the programs may be stored in an attachable storage device which is accessible through communication networks such as the Internet, Intranet, LAN, WAN, storage area network (SAN), and a combination thereof. Such a storage device may access the electronic device via an external port. Further, a separate storage device on the communication network may access a portable electronic device.

In the above-described embodiments of the disclosure, a component included in the disclosure is expressed in the singular or the plural according to an embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but is defined by the appended claims and equivalents thereof.

What is claimed is:

1. An electronic device, comprising:
a camera;
a display;
a sensor; and
a processor,
wherein the processor is configured to:
acquire one or more images including an external object through the camera,
identify a position of the external object relative to the electronic device through at least one of the camera and the sensor, the position of the external object including a distance between the external object and the electronic device,
determine whether the distance between the external object and the electronic device is within a threshold distance range,
display the avatar corresponding to the external object based on the identified position of the external object through the display, if the distance between the external object and the electronic device is within the threshold distance range, wherein a size of the avatar is determined based on the distance between the external object and the electronic device, and
display a specified avatar image through the display, if the distance between the external object and the electronic device is less than or equal to a lower limit of the threshold distance range.

2. The electronic device of claim 1, wherein the processor is further configured to:
determine to change the size of the avatar as the distance changes, if the distance between the external object and the electronic device is within the threshold distance range,
determine that the size of the avatar has a specified first size, if the distance between the external object and the electronic device is greater than or equal to an upper limit of the threshold distance range,
determine that the size of the avatar has a specified second size, if the distance between the external object and the electronic device is less than or equal to a lower limit of the threshold distance range, and
display the avatar corresponding to the external object through the display based on the determined size of the avatar.

3. The electronic device of claim 1,
wherein the processor is further configured to identify the distance between the external object and the electronic device based on a ratio of an area of a portion of the external object to an area of a preview image displayed by the display, and
wherein the preview image is related to the one or more images.

4. The electronic device of claim 1,
wherein the sensor includes a wearable sensor installed to the external object, and
wherein the processor is further configured to identify the distance between the external object and the electronic device based on data received from the wearable sensor.

5. The electronic device of claim 1, wherein the processor is further configured to:
determine attributes of a background of the avatar based on the position of the external object relative to the electronic device, and
provide the background and the avatar together through the display according to the attributes,
wherein the attributes of the background include a blur effect of the background and a size of the background.

6. The electronic device of claim 5,
wherein the processor is further configured to determine the size of the background based on the distance between the external object and the electronic device.

7. The electronic device of claim 1,
wherein the processor is further configured to determine a view area in the avatar based on the position and provide the view area in the avatar through the display.

8. The electronic device of claim 7,
wherein the processor is further configured to determine an angle at which the electronic device moves with respect to the external object and a direction of the angle and move the view area in the avatar by the angle in the direction.

9. The electronic device of claim 1,
wherein the processor is further configured to identify a plurality of components of the avatar, apply different animation schemes to at least two components of the plurality of components, and display the avatar having the at least two components, to which the different animation schemes are applied, through the display.

10. The electronic device of claim 9,
wherein the different animation schemes include at least one of a motion-based animation scheme, a tracking-based animation scheme, or a preloaded animation scheme.

11. An operating method of an electronic device comprising a camera, a display, and a sensor, the operating method comprising:
acquiring one or more images including an external object through the camera;
identifying a position of the external object relative to the electronic device through at least one of the camera and the sensor, the position of the external object including a distance between the external object and the electronic device;
determining whether the distance between the external object and the electronic device is within a threshold distance range;
displaying the avatar corresponding to the external object based on the identified position of the external object through the display, if the distance between the external object and the electronic device is within the threshold distance range, wherein a size of the avatar is determined based on the distance between the external object and the electronic device; and
displaying a specified avatar image through the display, if the distance between the external object and the electronic device is less than or equal to a lower limit of the threshold distance range.

12. The operating method of claim 11, further comprising:
determining to change the size of the avatar as the distance changes, if the distance between the external object and the electronic device is within the threshold distance range:
determining that the size of the avatar has a specified first size, if the distance between the external object and the electronic device is greater than or equal to an upper limit of the threshold distance range:
determining that the size of the avatar has a specified second size, if the distance between the external object and the electronic device is less than or equal to a lower limit of the threshold distance range: and
displaying the avatar corresponding to the external object through the display based on the determined size of the avatar.

13. The operating method of claim 11, further comprising:
identifying the distance between the external object and the electronic device based on a ratio of an area of a portion of the external object to an area of a preview image displayed by the display,
wherein the preview image is related to the one or more images.

14. The operating method of claim 11, further comprising:
identifying the distance between the external object and the electronic device based on data received from a wearable sensor,
wherein the wearable sensor is installed to the external object.

15. The operating method of claim 11, further comprising:
determining attributes of a background of the avatar based on the position of the external object relative to the electronic device; and
providing the background and the avatar together through the display according to the attributes,
wherein the attributes of the background include a blur effect of the background and a size of the background.

16. The operating method of claim 15, further comprising:
determining the size of the background based on the distance between the external object and the electronic device.

17. The operating method of claim 11, further comprising:
determining a view area in the avatar based on the position; and
providing the view area in the avatar through the display.

18. The operating method of claim 17, further comprising:
determining an angle at which the electronic device moves with respect to the external object and a direction of the angle; and
moving the view area in the avatar by the angle in the direction.

19. The operating method of claim 11, further comprising:
identifying a plurality of components of the avatar;
applying different animation schemes to at least two components of the plurality of components, and
displaying the avatar having the at least two components, to which the different animation schemes are applied, through the display.

20. The operating method of claim 19,
wherein the different animation schemes include at least one of a motion-based animation scheme, a tracking-based animation scheme, or a preloaded animation scheme.

* * * * *